United States Patent
Stone et al.

(10) Patent No.: US 12,253,106 B2
(45) Date of Patent: Mar. 18, 2025

(54) COUPLER FOR THREADED REINFORCING BAR

(71) Applicant: Illinois Tool Works Inc., Glenview, IL (US)

(72) Inventors: James Stone, Melbourne (AU); Andrew Coumaros, Melbourne (AU); Jonathan Lim, Melbourne (AU); Bryan Kennedy, Glenview, IL (US)

(73) Assignee: Illinois Tool Works Inc., Glenview, IL (US)

( * ) Notice: Subject to any disclaimer, the term of this patent is extended or adjusted under 35 U.S.C. 154(b) by 422 days.

(21) Appl. No.: 17/736,368

(22) Filed: May 4, 2022

(65) Prior Publication Data

US 2022/0356893 A1 Nov. 10, 2022

(30) Foreign Application Priority Data

May 4, 2021 (AU) .................................. 2021901323

(51) Int. Cl.
*F16B 7/18* (2006.01)
(52) U.S. Cl.
CPC .................................... *F16B 7/182* (2013.01)
(58) Field of Classification Search
CPC .. F16B 7/18; F16B 7/182; E04C 5/162; E04C 5/165; E04C 5/166; B21K 1/56; B21K 1/70; B21K 21/08
See application file for complete search history.

(56) References Cited

U.S. PATENT DOCUMENTS

| | | | | |
|---|---|---|---|---|
| 3,551,999 A | * | 1/1971 | Gutmann | B21D 39/04 29/517 |
| 3,782,839 A | * | 1/1974 | Majewski | F16B 7/06 403/43 |
| 4,084,829 A | * | 4/1978 | Falchle | B25D 17/08 173/104 |
| 4,143,986 A | * | 3/1979 | Antosh | E04C 5/165 403/312 |

(Continued)

FOREIGN PATENT DOCUMENTS

| | | |
|---|---|---|
| DE | 9218785 U1 | 7/1995 |
| DE | 102005010503 B3 | 6/2006 |

OTHER PUBLICATIONS

Genuine ReidBar™ Reinforcing and Connection Systems Product Guide, available prior to May 4, 2021 (9 pages).

(Continued)

*Primary Examiner* — Daniel J Wiley
(74) *Attorney, Agent, or Firm* — Neal, Gerber & Eisenberg LLP

(57) ABSTRACT

A coupler including a fitting for mounting to externally threaded reinforcing bar for use in concrete construction, the fitting including a body having a portion with an internal thread for engagement with the thread of the reinforcing bar, wherein the internal thread has an asymmetric thread form having an outer ramped portion and an inner ramped portion, the outer ramped portion being inclined to a central axis of the coupler at a first angle, the inner ramped portion being inclined to the central axis of the coupler at a second angle, the first angle being smaller in magnitude than the second angle.

13 Claims, 28 Drawing Sheets

(56) References Cited

U.S. PATENT DOCUMENTS

| | | | | |
|---|---|---|---|---|
| 4,295,751 | A * | 10/1981 | Holmberg | E21B 17/0426 |
| | | | | 285/390 |
| 4,586,861 | A | 5/1986 | Mckewan | |
| 4,799,844 | A * | 1/1989 | Chuang | E21B 17/0426 |
| | | | | 285/334 |
| 5,060,740 | A * | 10/1991 | Yousef | F16B 33/02 |
| | | | | 285/390 |
| 6,571,452 | B1 * | 6/2003 | Wang | B21K 1/70 |
| | | | | 72/356 |
| 7,032,286 | B2 * | 4/2006 | Wang | E04C 5/165 |
| | | | | 29/516 |
| 7,387,319 | B2 | 6/2008 | Papousek | |
| 7,416,374 | B2 | 8/2008 | Breihan et al. | |
| 7,455,329 | B2 | 11/2008 | Muradov et al. | |
| 7,722,304 | B2 | 5/2010 | Pritchard | |
| 8,668,232 | B2 | 3/2014 | Mazzaferro et al. | |
| 9,494,182 | B2 | 11/2016 | Matsubayashi | |
| 9,945,412 | B2 | 4/2018 | Huo | |
| 10,281,041 | B2 | 5/2019 | Lochmann | |
| 10,472,826 | B2 * | 11/2019 | Ki | F16B 7/18 |
| 11,067,205 | B2 | 7/2021 | Iwamoto et al. | |
| 11,454,268 | B2 * | 9/2022 | Murdoch | E04C 5/165 |
| 2006/0108805 | A1 * | 5/2006 | Papousek | E04C 5/165 |
| | | | | 285/355 |
| 2014/0147198 | A1 * | 5/2014 | Kim | E04C 5/165 |
| | | | | 403/361 |
| 2019/0024375 | A1 | 1/2019 | Murdoch | |

OTHER PUBLICATIONS

Precast Solutions Product Guide, 2019 Australia Edition of ramsetreid (70 pages).

Reinforcing Solutions, Reidbar™ Design Guide, 2015 Edition of ITW Construction Systems Australia Pty. Ltd. (40 pages).

* cited by examiner

COUPLER FOR THREADED REINFORCING BAR

PRIORITY CLAIM

The present application claims priority to and the benefit of Australian Provisional Patent Application No. 2021901323, filed May 4, 2021, the entire contents of which are incorporated herein by reference.

FIELD

The present disclosure relates to a coupler for threaded reinforcing bar for forming a mechanical connection such as in concrete construction.

BACKGROUND

One form of reinforcing bar used in concrete construction incorporates a continuous coarse external thread. The thread not only acts to form a key between the bar and concrete, it also enables a range of supplementary fittings easily to be applied to the bar by engagement of a mating thread with that of the bar. One such threaded reinforcing bar is marketed under the trade mark "ReidBar" by the Ramsetreid division of ITW Australia Pty Ltd, a related entity of the present applicant. The thread on the reinforcing bar is quite coarse and its pitch ranges from 8 mm fora bar of 12 mm diameter to around 16.5 mm fora bar diameter of 32 mm.

Internally threaded fittings for mounting over the end of threaded reinforcing bar for example for coupling lengths of bar in series tend, principally for cost considerations, to be of cast construction, cast iron predominantly, with the internal thread being formed during casting by a sand core. The internal thread formed in this way is not formed to the degree of accuracy which would be expected from a conventionally tapped thread and, moreover, the external thread on the bar itself is not formed to a particularly high degree of accuracy. A consequence of this is that there may not be a particularly tight engagement between the fitting and the bar and some slippage can occur between the bar and the fitting.

Slippage of a coupler on a threaded reinforcing bar can have serious consequences and relevant construction standards require that slip be limited and controlled. This can be difficult to achieve given the large tolerances involved in manufacturing coarse threaded bar. While slippage can be avoided by filling the interior of the coupler with an epoxy cement or by mounting a lock nut on the bar to tighten against the end of the coupler, these measures add to the time and cost of installing the coupler to the bar as well as not being accepted as solutions by certain construction authorities. Other methods include machining metric threads and swaging sleeves onto the ends of the bar. These are even more time-consuming, complex and expensive due to the extra processes and equipment required.

Accordingly, it is desirable to provide a coupler that can accommodate the loose tolerances of the reinforcing bar and minimise slip of the coupler along the reinforcing bar to within the required standard.

SUMMARY

Various embodiments of the present disclosure provide a coupler including a fitting for mounting to externally threaded reinforcing bar for use in concrete construction, the fitting including a body having a portion with an internal thread for engagement with the thread of the reinforcing bar, wherein the internal thread has an asymmetric thread form having an outer ramped portion and an inner ramped portion, the outer ramped portion being inclined to a central axis of the coupler at a first angle, the inner ramped portion being inclined to the central axis of the coupler at a second angle, the first angle being smaller in magnitude than the second angle.

In various embodiments, the coupler forms a mechanical connection for use in concrete construction.

In various embodiments, the outer ramped portion is arranged, such that on tightening threaded engagement of the reinforcing bar in the coupler, the external thread of the reinforcing bar is engaged in continuous line contact with the outer ramped portion.

In various embodiments, the outer ramped portion is a straight line in cross-section.

In various embodiments, the coupler is formed of a first component and a second component, the first component having a connecting part for connecting the first component to the second component. In various such embodiments, the second component is chosen from a set of interchangeable second components, each of the second components having a different form configured for a different purpose.

Various other embodiments of the present disclosure provide a kit for forming a coupler, including: a first component in the form of a fitting for mounting to externally threaded reinforcing bar for use in concrete construction, the fitting including a body having a portion with an internal thread for engagement with the thread of the reinforcing bar, wherein the internal thread has an asymmetric thread form having an outer ramped portion and an inner portion, the outer ramped portion being inclined to a central axis of the coupler at a first angle, wherein the externally threaded reinforcing bar is threaded into the internal thread of the coupler and tightened such that the external thread of the reinforcing bar is securely engaged in contact with the outer ramped portion of the internal thread; and a set of interchangeable second components adapted to be interchangeably engaged with the first component.

In various embodiments, the set of interchangeable second components includes at least one of the following: a reinforcing bar joiner having an internal thread form the same as the thread form of the first component, a threaded insert, a flange nut and a metric joiner.

Various other embodiments of the present disclosure provide an assembly including an externally threaded reinforcing bar and a coupler as described above, wherein the externally threaded reinforcing bar is threaded into the internal thread of the coupler and tightened such that the external thread of the reinforcing bar is engaged in continuous line contact with the outer ramped portion of the internal thread.

In accordance with another aspect of the present disclosure, there is provided an assembly including: an externally threaded reinforcing bar; and a coupler for mounting to externally threaded reinforcing bar for use in concrete construction, the fitting including a body having a portion with an internal thread for engagement with the thread of the reinforcing bar, wherein the internal thread has an asymmetric thread form having an outer ramped portion and an inner portion, the outer ramped portion being inclined to a central axis of the coupler at a first angle, wherein the externally threaded reinforcing bar is threaded into the internal thread of the coupler and tightened such that the external thread of the reinforcing bar is securely engaged in contact with the outer ramped portion of the internal thread.

In various embodiments, the external thread of the reinforcing bar is engaged in continuous line contact with the outer ramped portion of the internal thread. In various such embodiments, an outer rib of the external thread of the reinforcing bar is engaged in continuous line contact with the outer ramped portion of the internal thread. In various such embodiments, the coupler has an internal stop against which an end of the reinforcing bar abuts to facilitate engagement of the external thread of the reinforcing bar with the outer ramped portion of the internal thread.

BRIEF DESCRIPTION OF THE DRAWINGS

Various embodiments of the present disclosure will be described, by way of non-limiting example only, with reference to the accompanying drawings in which.

DETAILED DESCRIPTION

Figure 1:
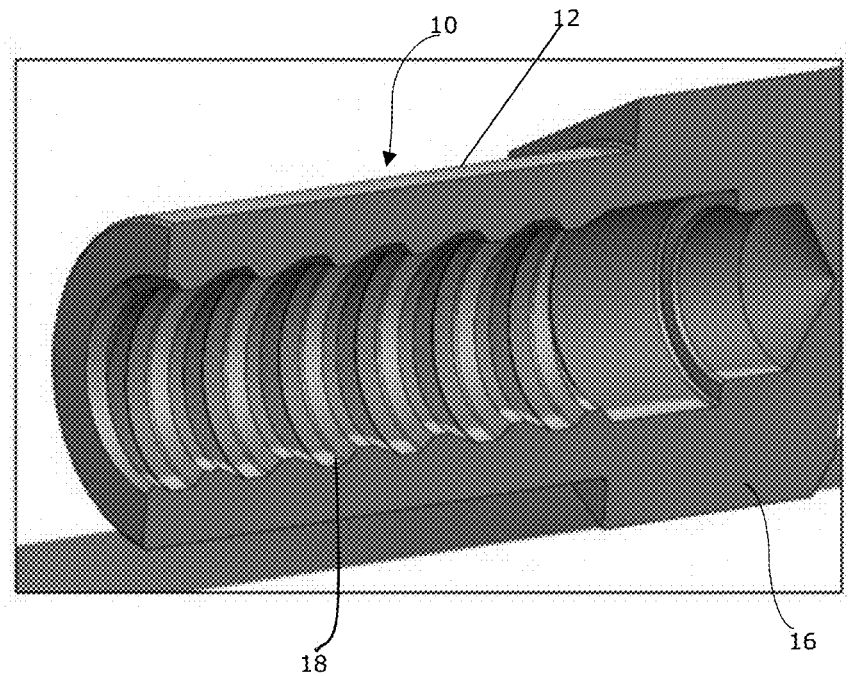
FIG. 1 shows a cutaway view of a coupler of one embodiment of the present disclosure, depicting detail of an internal thread form of the coupler for coupling to an externally threaded reinforcing bar for concrete reinforcement.

While the features, devices, and apparatus described herein may be embodied in various forms, the drawings how and the specification describe certain exemplary and non-limiting embodiments. Not all of the components shown in the drawings and described in the specification may be required, and certain implementations may include additional, different, or fewer components. Variations in the arrangement and type of the components; the shapes, sizes, and materials of the components; and the manners of connections of the components may be made without departing from the spirit or scope of the claims. Unless otherwise indicated, any directions referred to in the specification reflect the orientations of the components shown in the corresponding drawings and do not limit the scope of the present disclosure. Further, terms that refer to mounting methods, such as mounted, attached, connected, and the like, are not intended to be limited to direct mounting methods but should be interpreted broadly to include indirect and operably mounted, attached, connected and like mounting methods. This specification is intended to be taken as a whole and interpreted in accordance with the principles of the present disclosure and as understood by one of ordinary skill in the art.

With reference to FIGS. 1 to 46, there is shown a coupler 10 having improved performance. The coupler 10 has an internal thread having a threaded form that is able to engage with an external thread of a reinforcing bar so as to meet slip performance criteria in an improved manner. The coupler 10 is easier to use and saves time while still meeting slip performance criteria.

Figure 2:
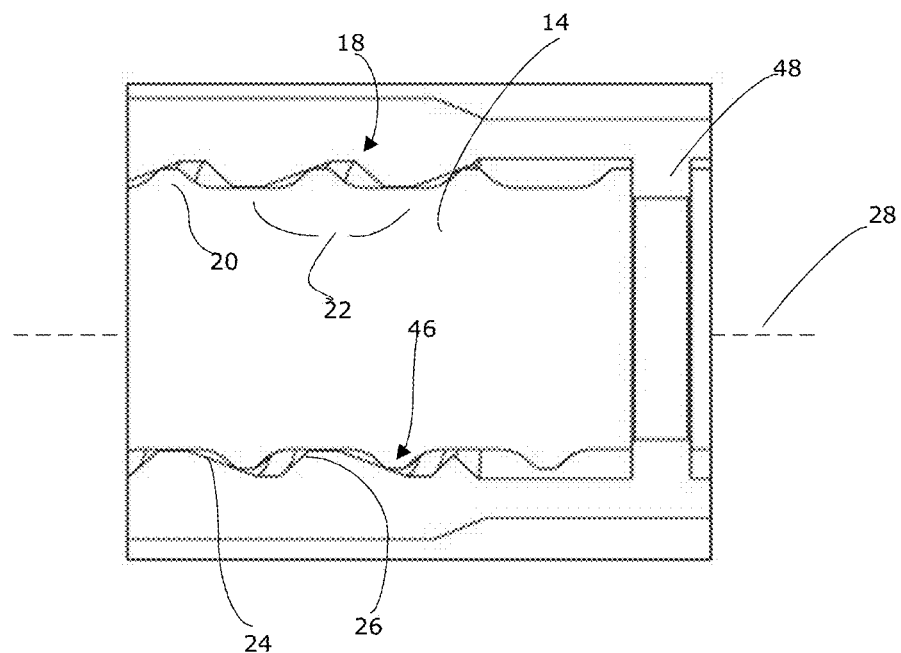
FIG. 2 is a cross-sectional diagram showing detail of engagement between an external thread of the reinforcing bar and the internal thread of the coupler.

More specifically, with reference to FIG. 1 and FIG. 2, there is shown a coupler 10 including a fitting 12 for mounting to an externally threaded reinforcing bar 14 for use in concrete construction. The fitting 12 includes a body 16 having a portion with an internal thread 18 for engagement with a thread 20 of the reinforcing bar 14. The internal thread 18 has an asymmetric thread form 22 having an outer ramped portion 24 and an inner ramped portion 26. The outer ramped portion 24 is inclined to a central axis 28 of the coupler 10 at a first angle and the inner ramped portion 26 is inclined to the central axis 28 of the coupler 10 at a second angle. The first angle is smaller in magnitude than the second angle. In this way, there is a ramping effect wherein the thread 20 of the reinforcing bar 14 is pulled into the outer ramped portion 24—or the acute angled flanks—of the thread form 22.

The outer ramped portion 24 is arranged, such that on tightening threaded engagement of the reinforcing bar 14 in the coupler 10, the external thread 20 of the reinforcing bar 14 is engaged in continuous line contact with the outer ramped portion 24. In the example shown, the outer ramped portion 24 is a straight line in cross-section.

The coupler 10 may be formed as a unitary fitting (see FIGS. 2 and 11) for coupling together two reinforcing bars or, alternatively, may be formed as a modular coupler having a first component and an interchangeable second component (see FIGS. 3 to 6, FIGS. 8 to 10, and FIGS. 12 to 46).

Figure 5:
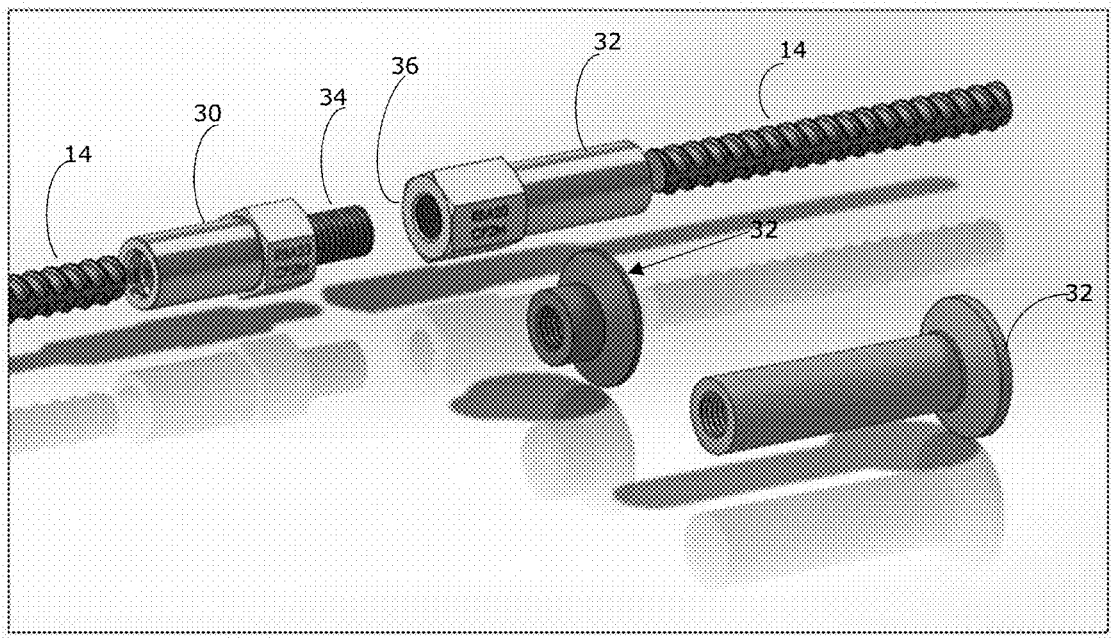
FIG. 5 shows a modular coupler including interchangeable parts to form part of the coupler.

With reference to FIG. 5, where the coupler 10 is formed as a modular coupler, it may be of the form having a first component 30 and a second component 32. The first component 30 may have a connecting part 34 for connecting the first component 30 to the second component 32. In particular, as shown in FIG. 5, the connecting part 34 may be in the form of a male threaded portion of the first component 30 which is threadedly received within a correspondingly threaded female thread 36 formed in the second component 32. The second component 32 is chosen from a set of interchangeable second components (see FIG. 5), each of the interchangeable second components 32 having a different form configured for a different purpose.

The present disclosure also provides a kit including a first component 30 and a set of interchangeable second components 32 which are able to be interchangeably connected to the first component 30. Such a kit may include the first component 30 (shown in FIG. 5) together with the three interchangeable second components 32 (also shown in FIG. 5).

Accordingly, there is provided a kit for forming a coupler, including a first component 30 in the form of a fitting 12 for mounting to externally threaded reinforcing bar 14 for use in concrete construction. The fitting 12 includes a body 16 having a portion with an internal thread 18 for engagement with the thread 20 of the reinforcing bar 14. The internal thread 18 has an asymmetric thread form 22 having an outer ramped portion 24 and an inner portion 26, the outer ramped portion 24 being inclined to the central axis 28 of the coupler 10 at a first angle. The externally threaded reinforcing bar 14 is threaded into the internal thread 18 of the coupler 10 and tightened such that the external thread 20 of the reinforcing bar 14 is securely engaged in contact with the outer ramped portion 24 of the internal thread 18. The kit also includes a set of interchangeable second components 32 adapted to be interchangeably engaged with/connected to the first component 30.

The set of interchangeable second components 32 may include at least one of the following: a reinforcing bar joiner component 38 (Part B) having an internal thread form 44 the same as the thread form 22 of the first component 30, a threaded insert component 40 (Part C) or a flange nut component 42 (Part D). The reinforcing bar joiner component 38 may also be used in isolation as a metric joiner, that is a reinforcing bar-to-metric coupler.

The present disclosure also provide an assembly including both the reinforcing bar 14 and the coupler 10 actually fitted to the reinforcing bar 14. The assembly can include an externally threaded reinforcing bar 14 and a coupler 10 as described above, wherein the externally threaded reinforcing bar 14 is threaded into the internal thread 18 of the coupler 10 and tightened such that the external thread 20 of the reinforcing bar 14 is engaged in continuous line contact with the outer ramped portion 24 of the internal thread 18.

The present disclosure also provides an assembly including an externally threaded reinforcing bar 14 and a coupler 10. The coupler 10 includes a fitting 12 for mounting to the externally threaded reinforcing bar 14 for use in concrete construction. The fitting 12 includes a body 16 having a portion with an internal thread 18 for engagement with the thread 20 of the reinforcing bar 14. The internal thread 18 has an asymmetric thread form 22 having an outer ramped portion 24 and an inner portion 26. The outer ramped portion 24 is inclined to a central axis 28 of the coupler 10 at a first angle. The externally threaded reinforcing bar 14 is threaded into the internal thread 18 of the coupler 10 and tightened such that the external thread 20 of the reinforcing bar 14 is securely engaged in contact with the outer ramped portion 24 of the internal thread 18.

The external thread 20 of the reinforcing bar 14 may be engaged in continuous line contact with the outer ramped portion 24 of the internal thread 18. More specifically, an outer rib 46 of the external thread 20 of the reinforcing bar 14 is engaged in continuous line contact with the outer ramped portion 24 of the internal thread 18. The coupler may have an internal stop 48 against which an end 50 of the reinforcing bar 14 abuts to facilitate engagement of the external thread 20 of the reinforcing bar 14 with the outer ramped portion 24 of the internal thread 18.

Figure 12:
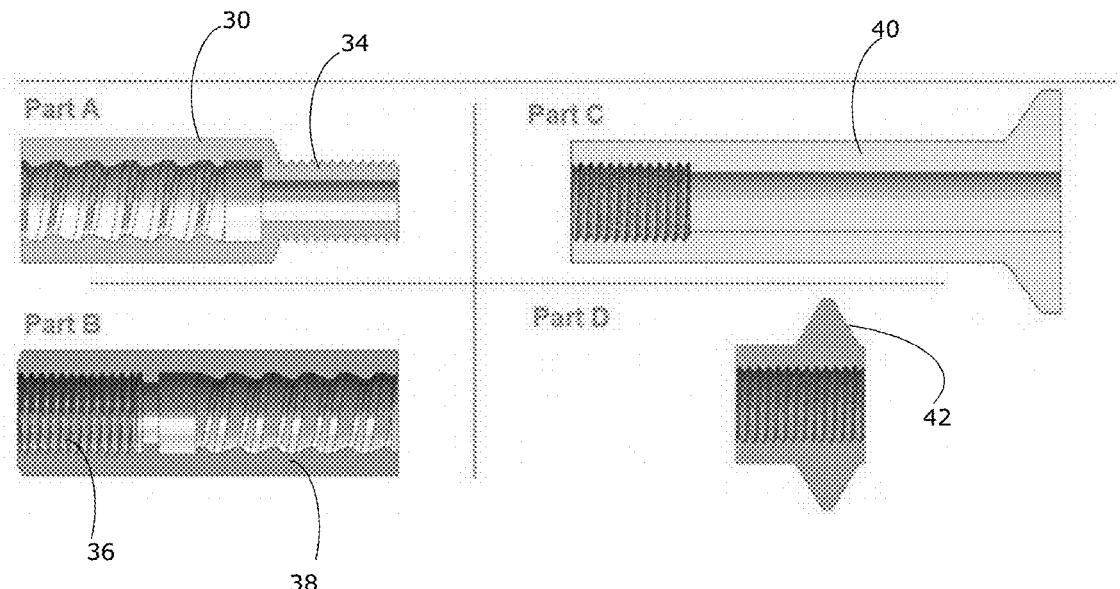
FIG. 12 shows interchangeable components wherein Part A is able to be coupled to any one of Parts B, C, or D.
Figure 13:
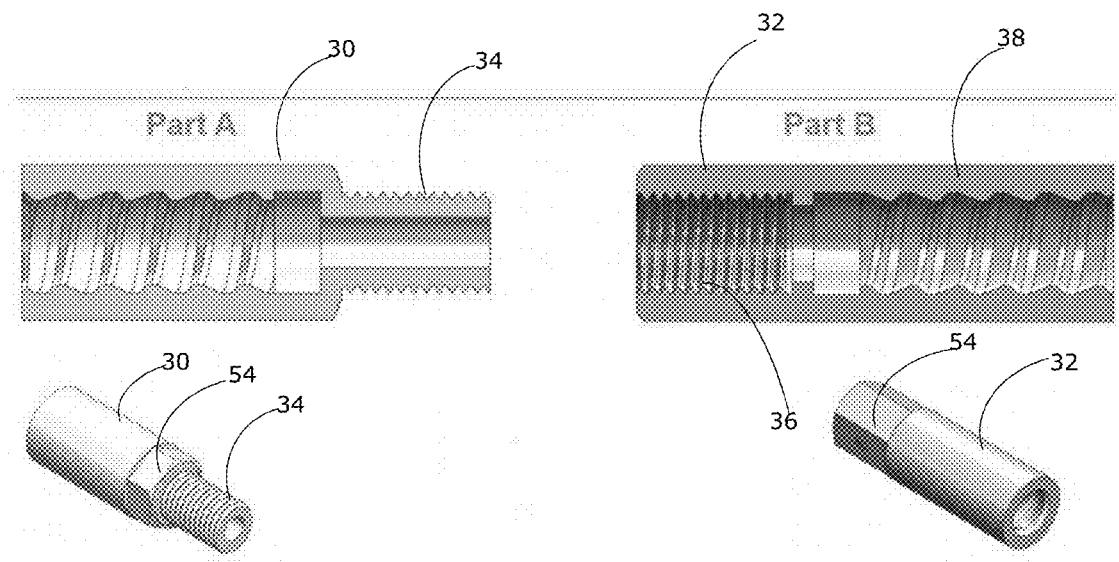
FIG. 13 shows Part A (externally threaded coupler) and Part B (internally threaded coupler) prior to connection.
Figure 14:
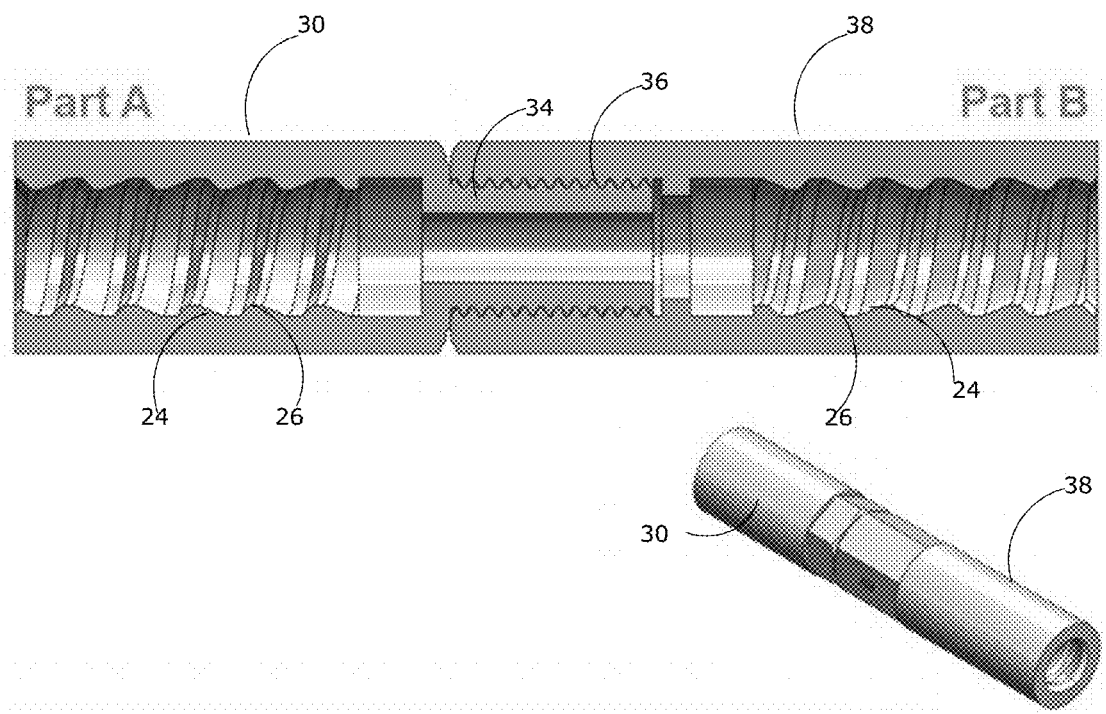
FIG. 14 shows Part A and Part B when connected.

FIG. 12 shows the kit including the first component 30 and the interchangeable second components 32 (including reinforcing bar joiner component 38, threaded insert component 40 and flange nut component 42). FIGS. 13 and 14 show the first component 30 being joined to the reinforcing bar joiner component 38. Each of the first component 30 and the reinforcing bar joiner component 38 may be provided with an integrally formed gripping formation (for example a hex nut head) to facilitate tightening of each of the components 30, 38 onto the respective externally threaded reinforcing bar. A new or uncommon thread profile may be provided to the connecting part 34 and the female thread 36 so as to prevent non-proprietary (and potentially untested) parts from being used in substitute of the genuine parts which have been tested for quality and safety. The connecting part 34 of the first component 30 may be provided with a through hole at the end to allow passage.

Figure 15:
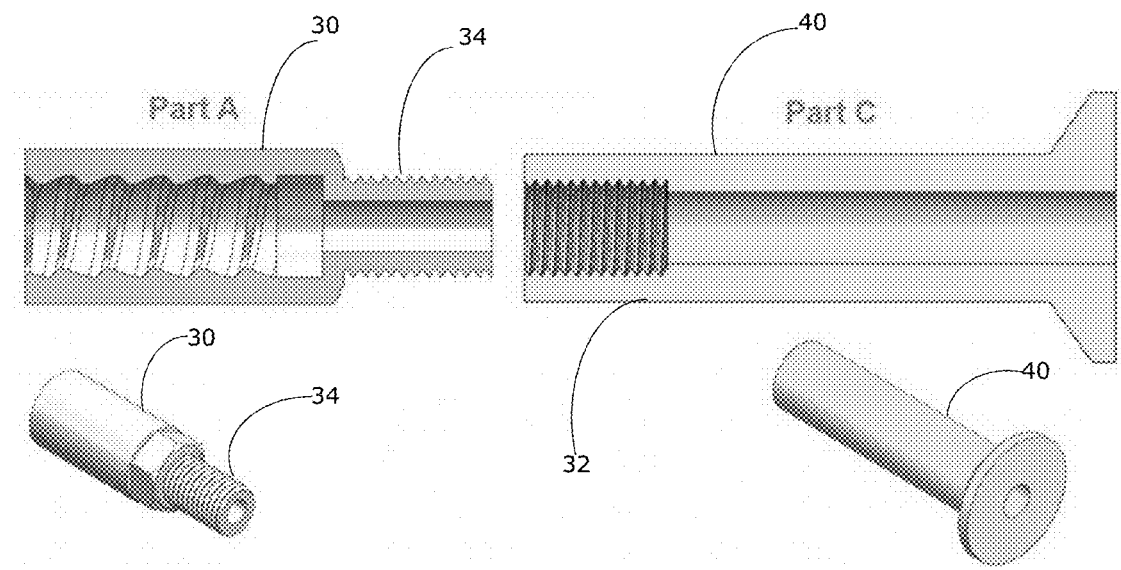
FIG. 15 shows Part A and part C (threaded insert) prior to connection.
Figure 16:
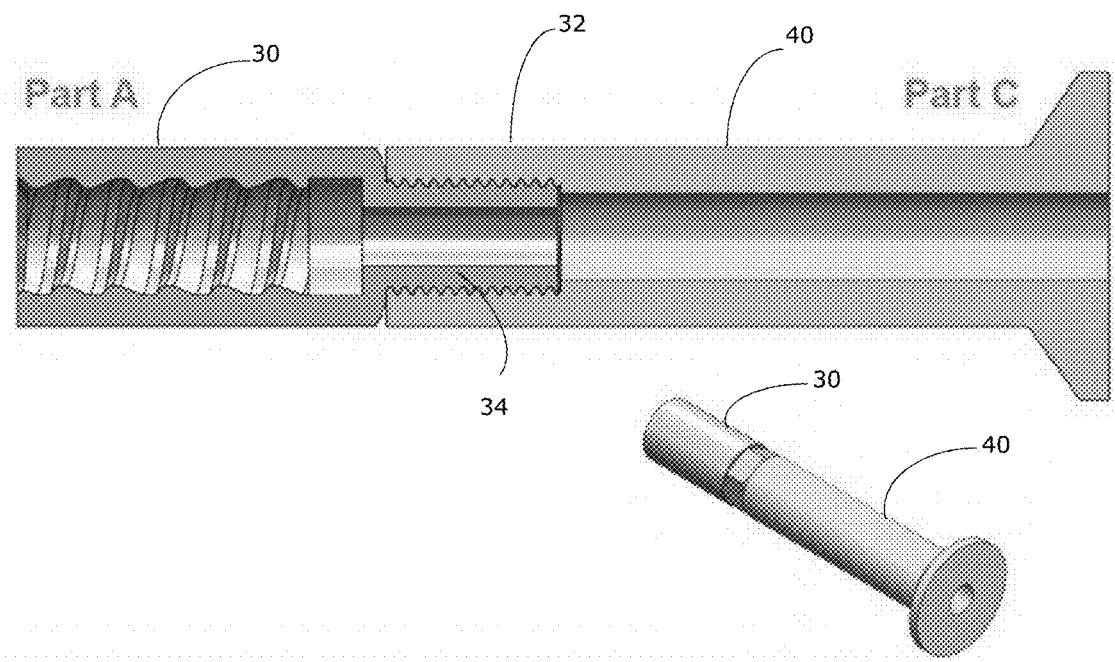
FIG. 16 shows Part A and Part C when connected.

With reference to FIGS. 15 and 16, there is shown a first component 30 being joined to the threaded insert component 40. The threaded insert component 40 may be provided with a height corresponding to the required embedment depth and may be provided with a through hole as shown.

Figure 17:
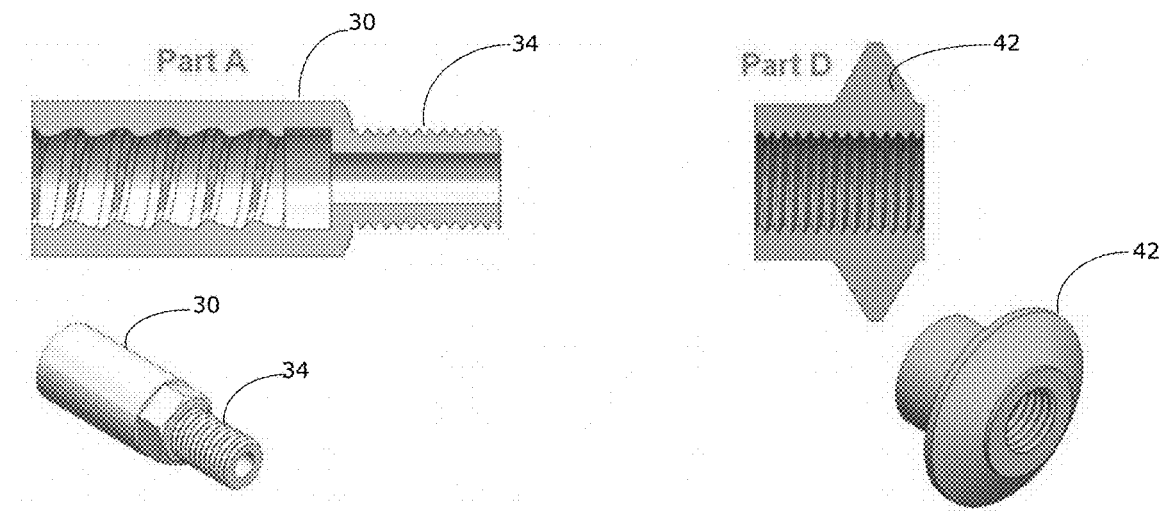
FIG. 17 shows Part A and Part D (flange nut) prior to connection.
Figure 18:
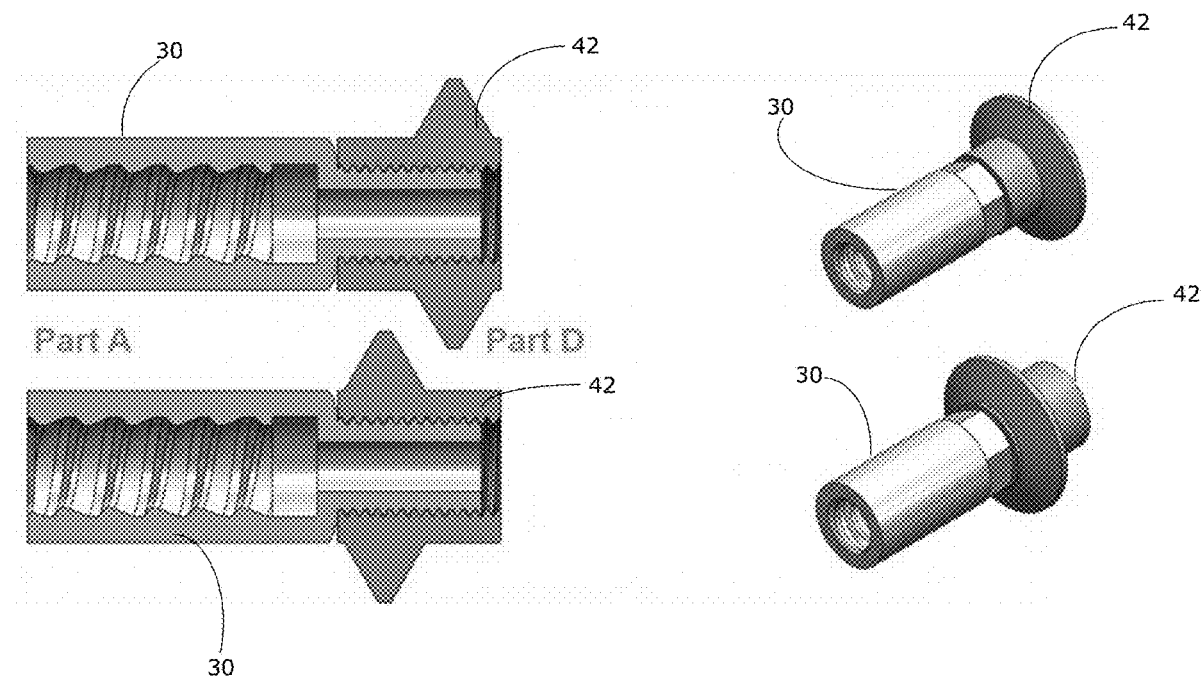
FIG. 18 shows Part A and Part D when connected, also with Part D in a flipped orientation.
Figure 19:
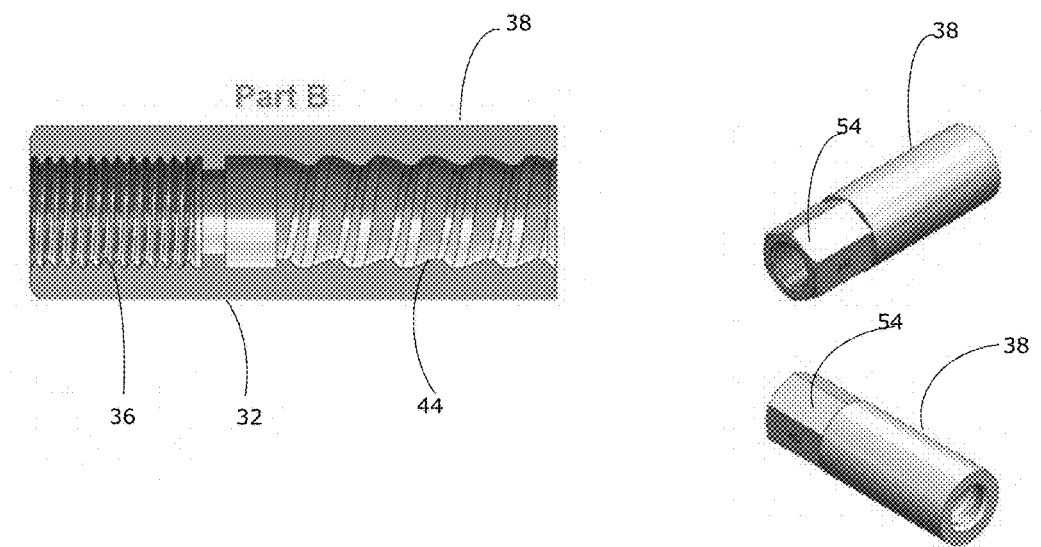
FIG. 19 shows detail of the second component in the form of Part B.
Figure 20:
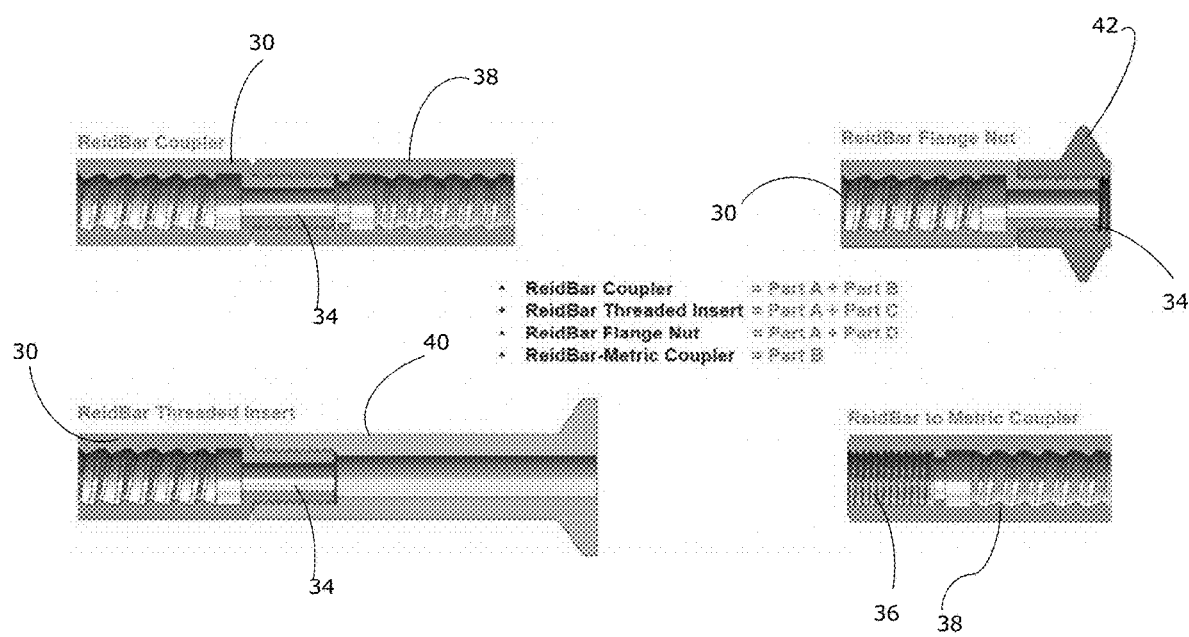
FIG. 20 shows a range of products possible through connection of Parts A, B, C, and D.

FIGS. 17 and 18 show the first component 30 being joined to the flange nut component 42 in a regular orientation as well as in a flipped orientation to attain a different anchor position.

By virtue of the interchangeability, there is provided flexibility and simple user interaction. The interchangeability may also be advantageous in reducing overall cost by way of volume. Also, the interchangeability may facilitate consistent installation methods across all products provided by the kit.

FIGS. 21 to 30 show detail of specific examples of the first component 30 and the reinforcing bar joiner component 38. In particular, each of these figures includes a cross-sectional view, a detailed cross-sectional view of the thread form 22, a detailed cross-sectional view of the internal stop 48 (where the drawing depicts the reinforcing bar joiner component 38), a side view, an end view and a perspective view.

Figure 21:
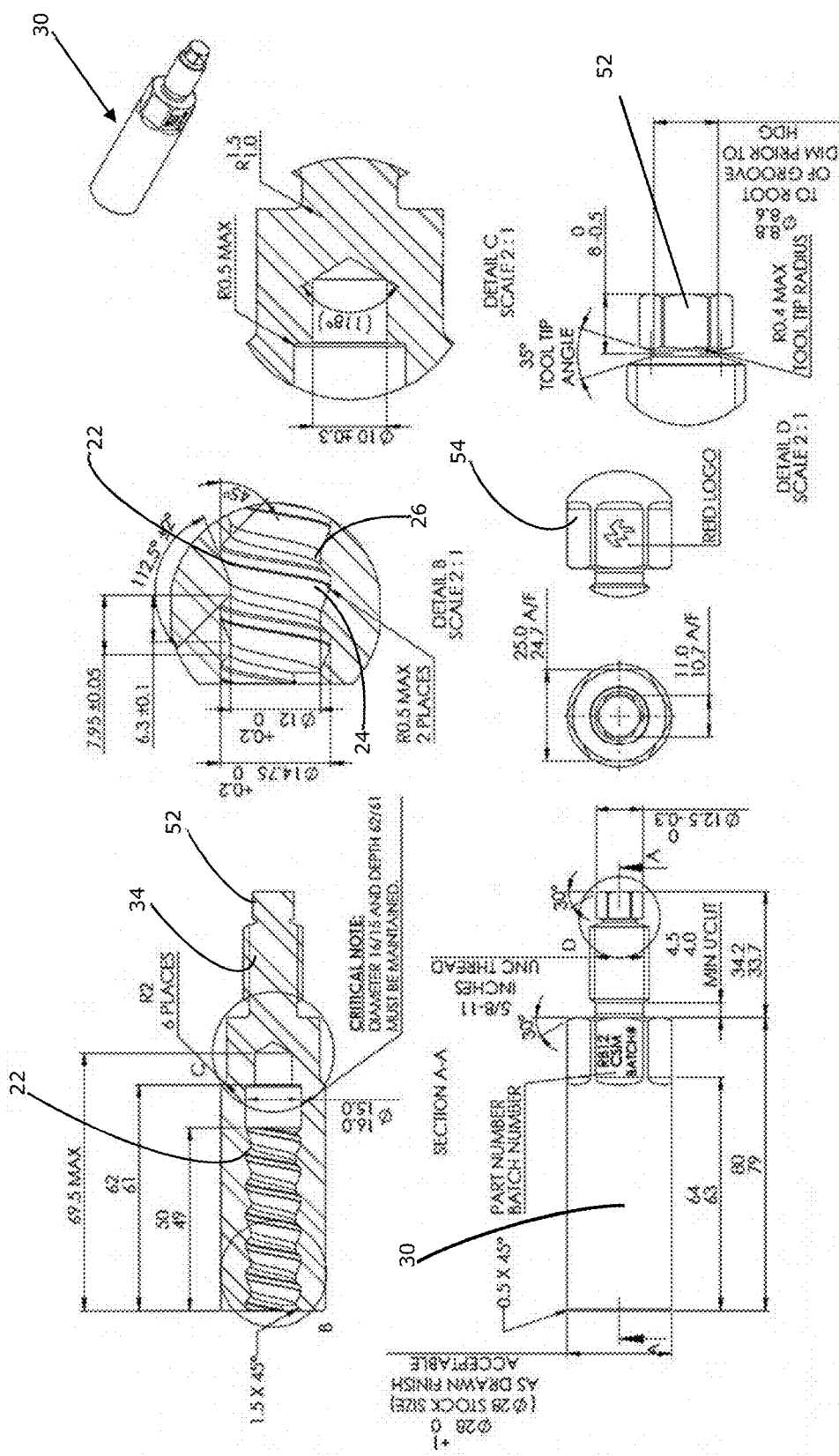
FIGS. 21 to 30 show detail of component parts of a modular coupler in accordance with examples of the present disclosure.

More specifically, FIG. 21 discloses a male first component 30 having an asymmetric thread form 22 in which the thread has an inner diameter of 12 mm and an outer diameter of 14.75 mm, as shown. The inner ramped portion 26 is at an angle of 45° to a central axis of the male first component 30, whereas the outer ramped portion 24 is at an angle of 112.5° to the inner ramped portion 26, meaning that the outer ramped portion 24 is at an angle of 22.5° to the central axis (the angle of 22.5° being less than the angle of 45° to facilitate a wedging effect so as to meet slip performance criteria in an improved manner). The male first component 30 is provided with a shear nut 52 which is formed with a frangible portion which shears when the first component 30 is threaded onto externally threaded reinforcing bar 14 to a desired torque, to facilitate installation and to provide a simple torque indication. The first component 30 is also provided with an external nut formation 54 to facilitate external gripping of the first component 30 by a tool to control rotation of the first component 30. The external nut formation 54 may be recessed within an outer diameter of the first component 30 (to save material), or, alternatively, may protrude radially outwardly of the outer diameter of the first component 30 as shown in FIG. 5. The first component 30 is provided with a connecting part 34 in the form of a metric male thread for coupling to the female reinforcing bar joiner component 38 of FIG. 22.

Figure 22:
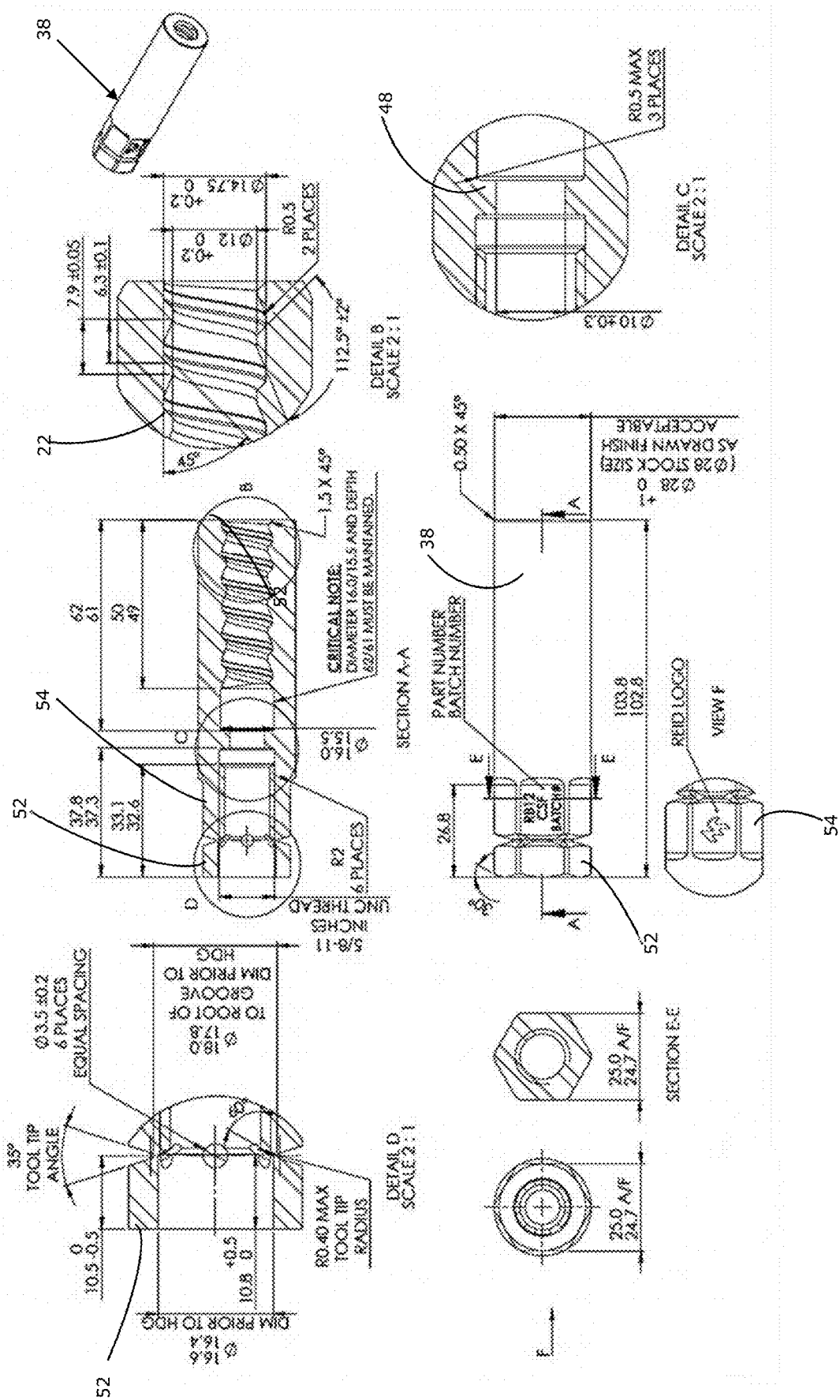

FIG. 22 discloses a female reinforcing bar joiner component 38 having an asymmetric thread form 22 in which the thread has an inner diameter of 12 mm and an outer diameter of 14.75 mm, as shown. The inner ramped portion 26 is at an angle of 45° to a central axis of the female reinforcing bar joiner component 38, whereas the outer ramped portion 24 is at an angle of 112.5° to the inner ramped portion 26, meaning that the outer ramped portion 24 is at an angle of 22.5° to the central axis (the angle of 22.5° being less than the angle of 45° to facilitate a wedging effect so as to meet slip performance criteria in an improved manner). The female reinforcing bar joiner component 38 is provided with a shear nut 52 which is formed with a frangible portion which shears when the female reinforcing bar joiner component 38 is threaded onto externally threaded reinforcing bar 14 to a desired torque, to facilitate installation and to provide a simple torque indication. The female reinforcing bar joiner component 38 is also provided with an external nut formation 54 to facilitate external gripping of the female reinforcing bar joiner component 38 by a tool to control rotation of the female reinforcing bar joiner component 38. The external nut formation 54 may be recessed within an outer diameter of the female reinforcing bar joiner component 38 (to save material), or, alternatively, may protrude radially outwardly of the outer diameter of the female reinforcing bar joiner component 38 as shown in FIG. 5. The female reinforcing bar joiner component 38 is provided with a metric female thread 36 for coupling to the first component 30 of FIG. 21.

Figure 23:
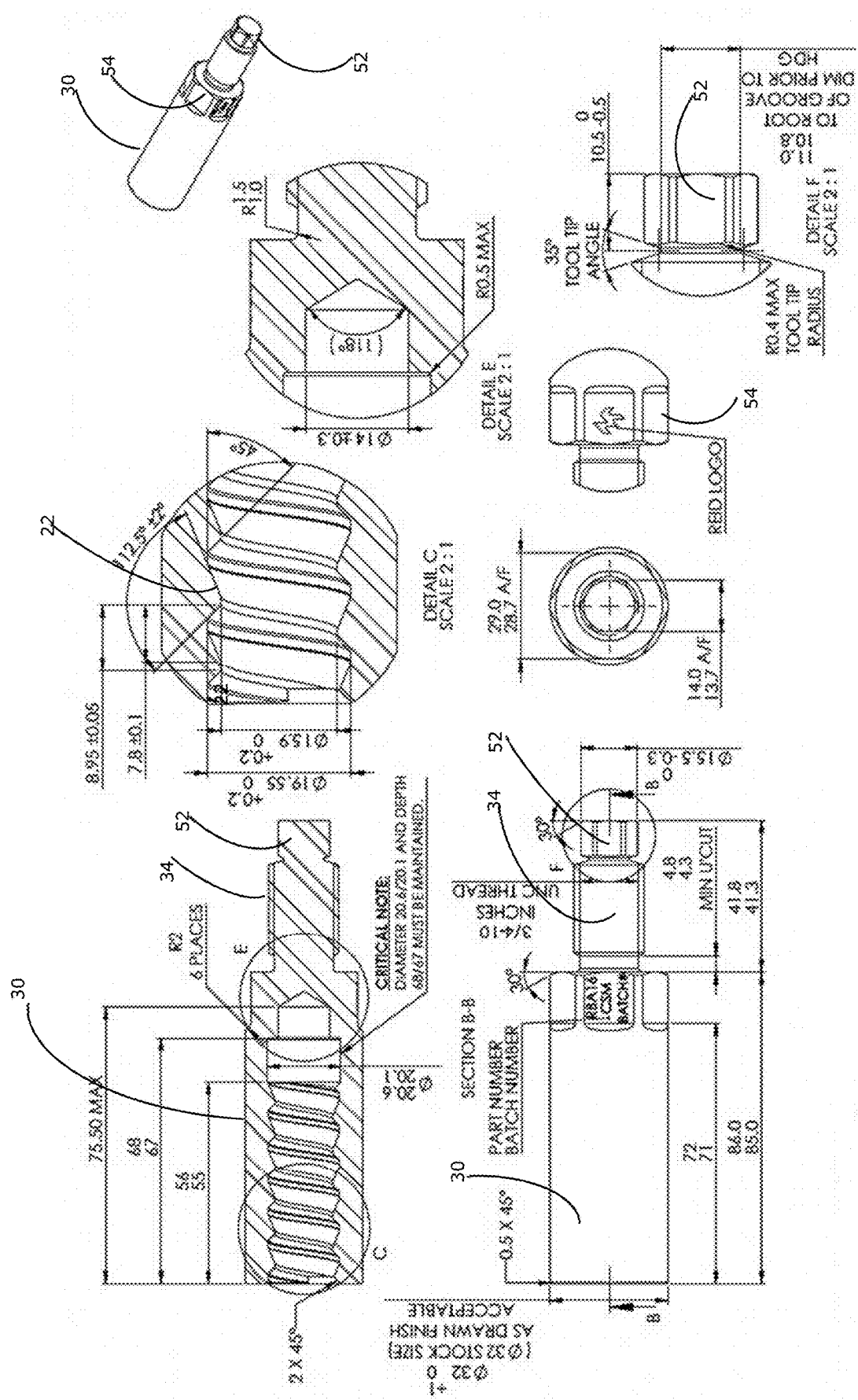

FIG. 23 discloses a male first component 30 having an asymmetric thread form 22 in which the thread has an inner diameter of 15.9 mm and an outer diameter of 19.55 mm, as shown. The inner ramped portion 26 is at an angle of 45° to a central axis of the male first component 30, whereas the outer ramped portion 24 is at an angle of 112.5° to the inner ramped portion 26, meaning that the outer ramped portion 24 is at an angle of 22.5° to the central axis (the angle of 22.5° being less than the angle of 45° to facilitate a wedging effect so as to meet slip performance criteria in an improved manner). The male first component 30 is provided with a shear nut 52 which is formed with a frangible portion which shears when the first component 30 is threaded onto externally threaded reinforcing bar 14 to a desired torque, to facilitate installation and to provide a simple torque indication. The first component 30 is also provided with an external nut formation 54 to facilitate external gripping of the first component 30 by a tool to control rotation of the first component 30. The external nut formation 54 may be recessed within an outer diameter of the first component 30 (to save material), or, alternatively, may protrude radially outwardly beyond the outer diameter of the first component 30 as shown in FIG. 5. The first component 30 is provided with a connecting part 34 in the form of a metric male thread for coupling to the female reinforcing bar joiner component 38 of FIG. 24.

Figure 24:
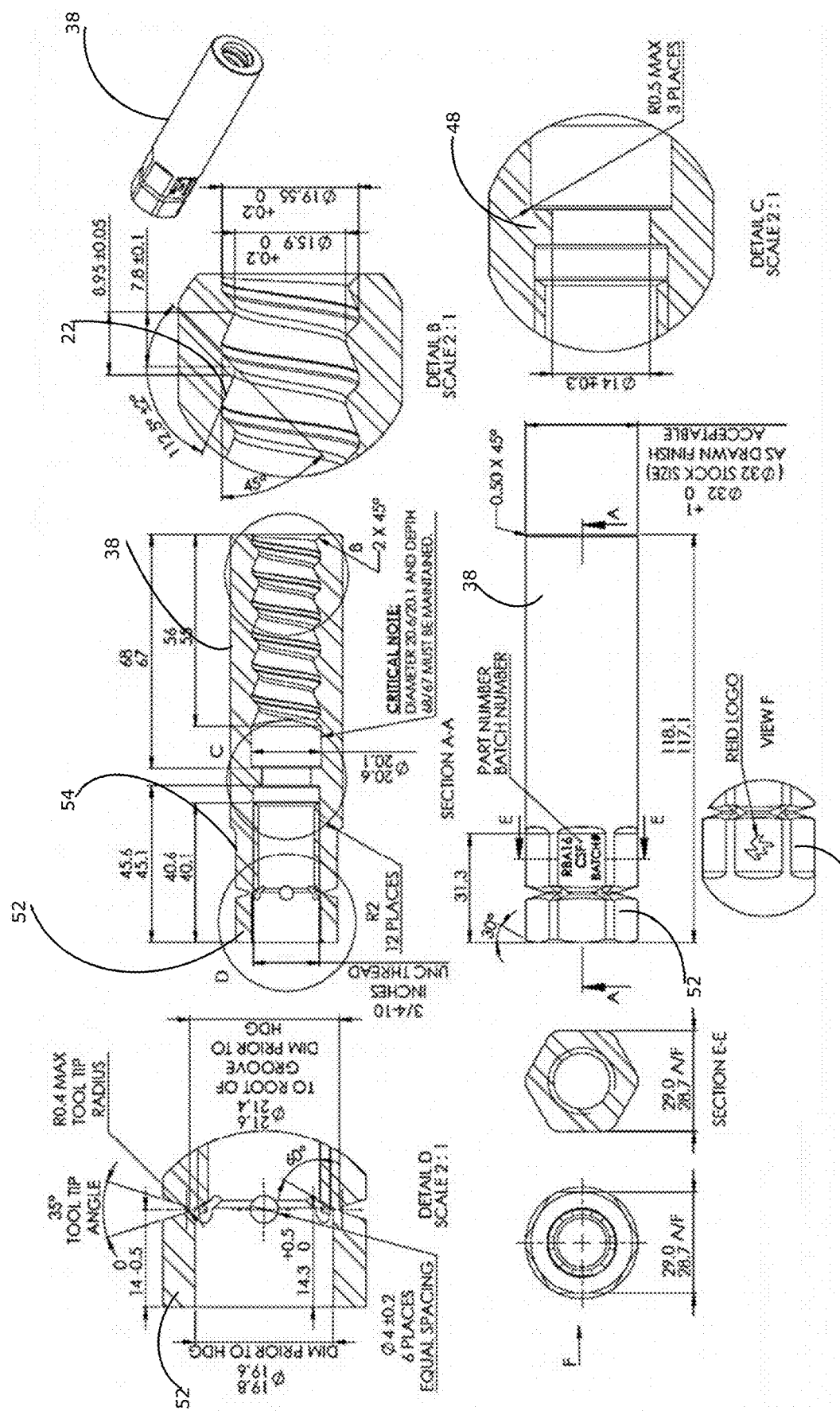

FIG. 24 discloses a female reinforcing bar joiner component 38 having an asymmetric thread form 22 in which the thread has an inner diameter of 15.9 mm and an outer diameter of 19.55 mm, as shown. The inner ramped portion 26 is at an angle of 45° to a central axis of the female reinforcing bar joiner component 38, whereas the outer ramped portion 24 is at an angle of 112.5° to the inner ramped portion 26, meaning that the outer ramped portion 24 is at an angle of 22.5° to the central axis (the angle of 22.5° being less than the angle of 45° to facilitate a wedging effect so as to meet slip performance criteria in an improved manner). The female reinforcing bar joiner component 38 is provided with a shear nut 52 which is formed with a frangible portion which shears when the female reinforcing bar joiner component 38 is threaded onto externally threaded reinforcing bar 14 to a desired torque, to facilitate installation and to provide a simple torque indication. The female reinforcing bar joiner component 38 is also provided with an external nut formation 54 to facilitate external gripping of the female reinforcing bar joiner component 38 by a tool to control rotation of the female reinforcing bar joiner component 38. The external nut formation 54 may be recessed within an outer diameter of the female reinforcing bar joiner component 38 (to save material), or, alternatively, may protrude radially outwardly beyond the outer diameter of the female reinforcing bar joiner component 38 as shown in FIG. 5. The female reinforcing bar joiner component 38 is provided with a metric female thread 36 for coupling to the first component 30 of FIG. 23.

Figure 25:
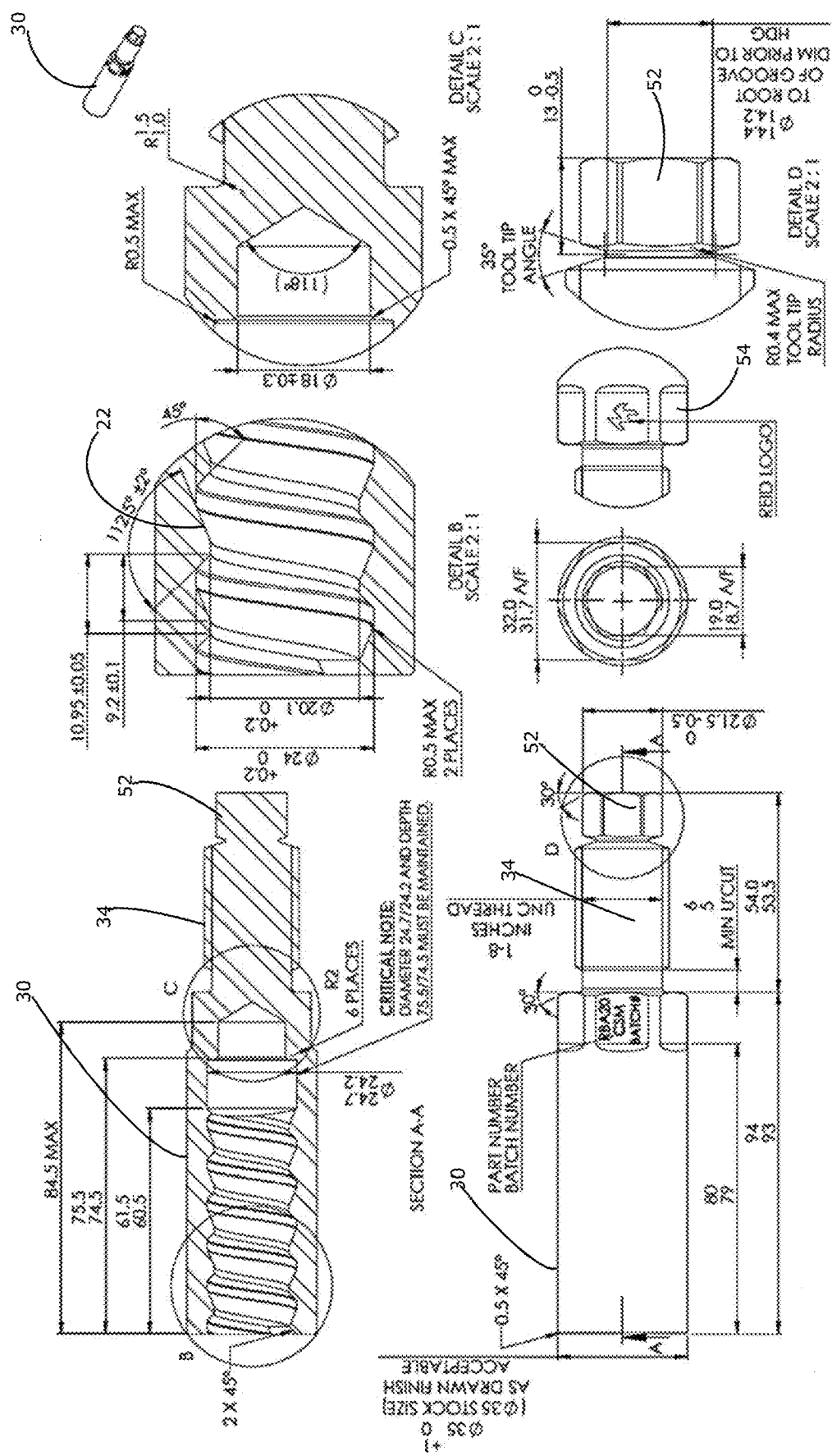

FIG. 25 discloses a male first component 30 having an asymmetric thread form 22 in which the thread has an inner diameter of 20.1 mm and an outer diameter of 24 mm, as shown. The inner ramped portion 26 is at an angle of 45° to a central axis of the male first component 30, whereas the outer ramped portion 24 is at an angle of 112.5° to the inner ramped portion 26, meaning that the outer ramped portion 24 is at an angle of 22.5° to the central axis (the angle of 22.5° being less than the angle of 45° to facilitate a wedging effect so as to meet slip performance criteria in an improved manner). The male first component 30 is provided with a shear nut 52 which is formed with a frangible portion which shears when the first component 30 is threaded onto externally threaded reinforcing bar 14 to a desired torque, to facilitate installation and to provide a simple torque indication. The first component 30 is also provided with an external nut formation 54 to facilitate external gripping of the first component 30 by a tool to control rotation of the first component 30. The external nut formation 54 may be recessed within an outer diameter of the first component 30 (to save material), or, alternatively, may protrude radially outwardly beyond the outer diameter of the first component 30 as shown in FIG. 5. The first component 30 is provided with a connecting part 34 in the form of a metric male thread for coupling to the female reinforcing bar joiner component 38 of FIG. 26.

Figure 26:
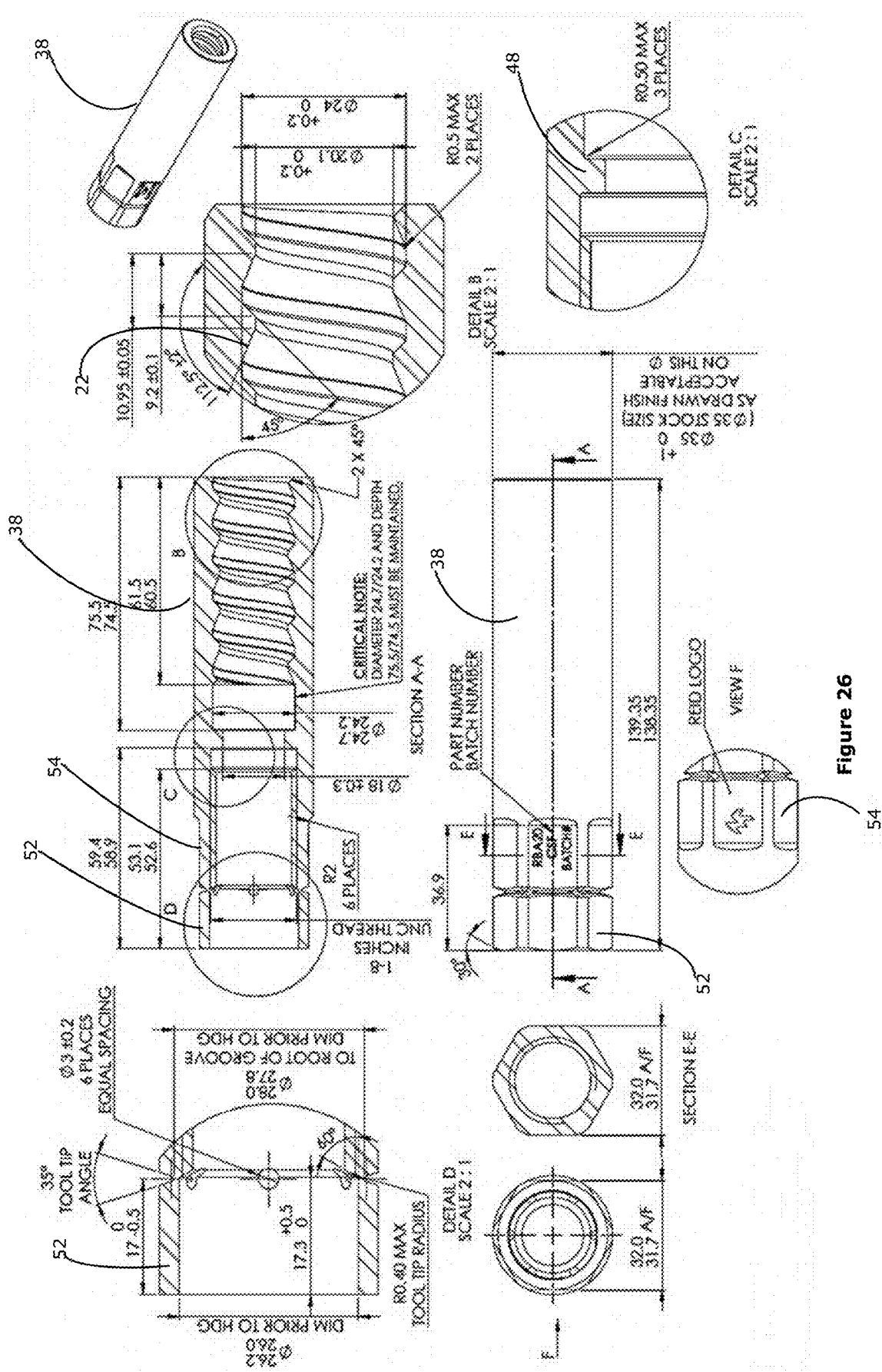

FIG. 26 discloses a female reinforcing bar joiner component 38 having an asymmetric thread form 22 in which the thread has an inner diameter of 20.1 mm and an outer diameter of 24 mm, as shown. The inner ramped portion 26 is at an angle of 45° to a central axis of the female reinforcing bar joiner component 38, whereas the outer ramped portion 24 is at an angle of 112.5° to the inner ramped portion 26, meaning that the outer ramped portion 24 is at an angle of 22.5° to the central axis (the angle of 22.5° being less than the angle of 45° to facilitate a wedging effect so as to meet slip performance criteria in an improved manner). The female reinforcing bar joiner component 38 is provided with a shear nut 52 which is formed with a frangible portion which shears when the female reinforcing bar joiner component 38 is threaded onto externally threaded reinforcing bar 14 to a desired torque, to facilitate installation and to provide a simple torque indication. The female reinforcing bar joiner component 38 is also provided with an external nut formation 54 to facilitate external gripping of the female reinforcing bar joiner component 38 by a tool to control rotation of the female reinforcing bar joiner component 38. The external nut formation 54 may be recessed within an outer diameter of the female reinforcing bar joiner component 38 (to save material), or, alternatively, may protrude radially outwardly beyond the outer diameter of the female reinforcing bar joiner component 38 as shown in FIG. 5. The female reinforcing bar joiner component 38 is provided with a metric female thread 36 for coupling to the first component 30 of FIG. 25.

Figure 27:
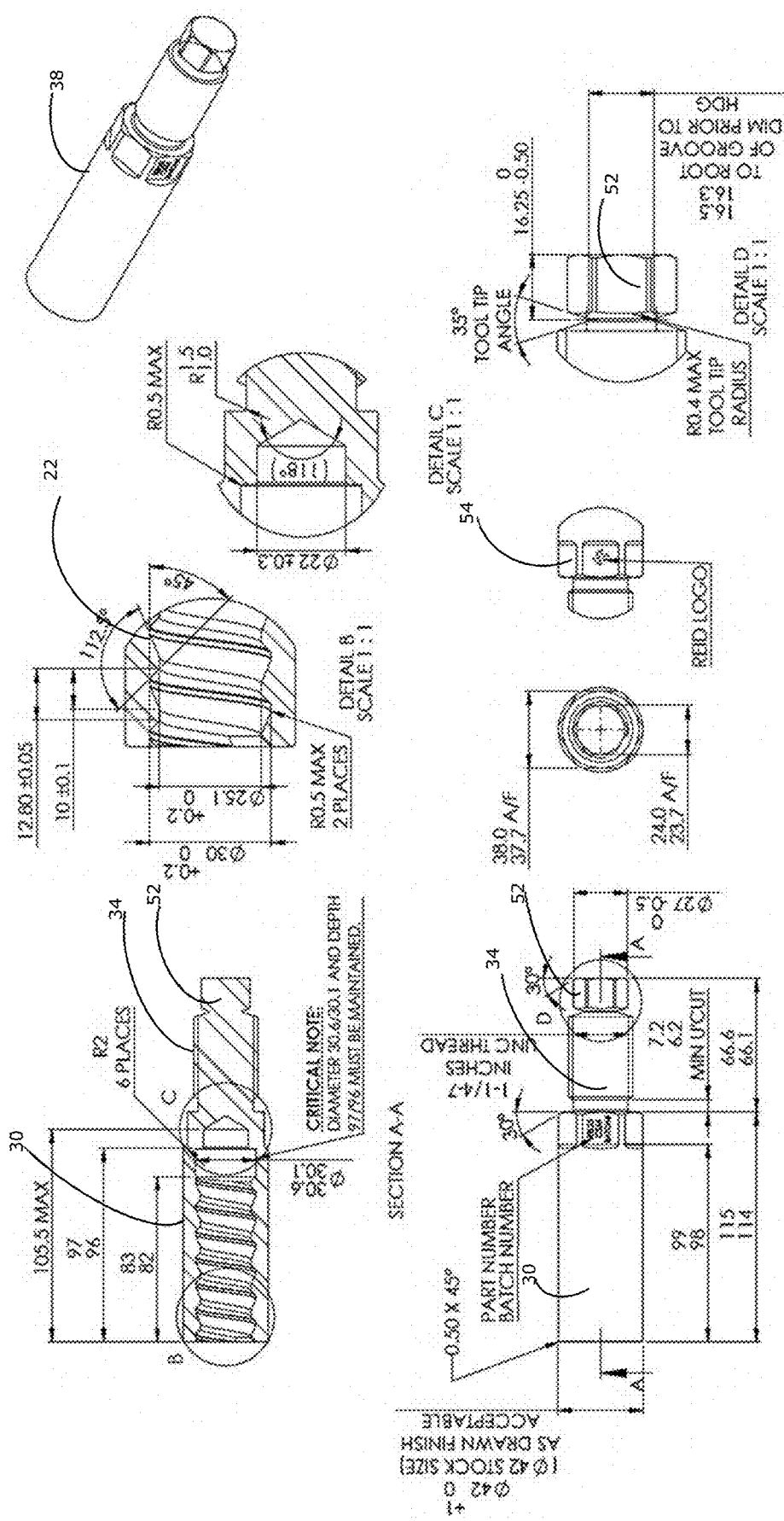

FIG. 27 discloses a male first component 30 having an asymmetric thread form 22 in which the thread has an inner diameter of 25.1 mm and an outer diameter of 30 mm, as shown. The inner ramped portion 26 is at an angle of 45° to a central axis of the male first component 30, whereas the outer ramped portion 24 is at an angle of 112.5° to the inner ramped portion 26, meaning that the outer ramped portion 24 is at an angle of 22.5° to the central axis (the angle of 22.5° being less than the angle of 45° to facilitate a wedging effect so as to meet slip performance criteria in an improved manner). The male first component 30 is provided with a shear nut 52 which is formed with a frangible portion which shears when the first component 30 is threaded onto externally threaded reinforcing bar 14 to a desired torque, to facilitate installation and to provide a simple torque indication. The first component 30 is also provided with an external nut formation 54 to facilitate external gripping of the first component 30 by a tool to control rotation of the first component 30. The external nut formation 54 may be recessed within an outer diameter of the first component 30 (to save material), or, alternatively, may protrude radially outwardly beyond the outer diameter of the first component 30 as shown in FIG. 5. The first component 30 is provided with a connecting part 34 in the form of a metric male thread for coupling to the female reinforcing bar joiner component 38 of FIG. 28.

Figure 28:
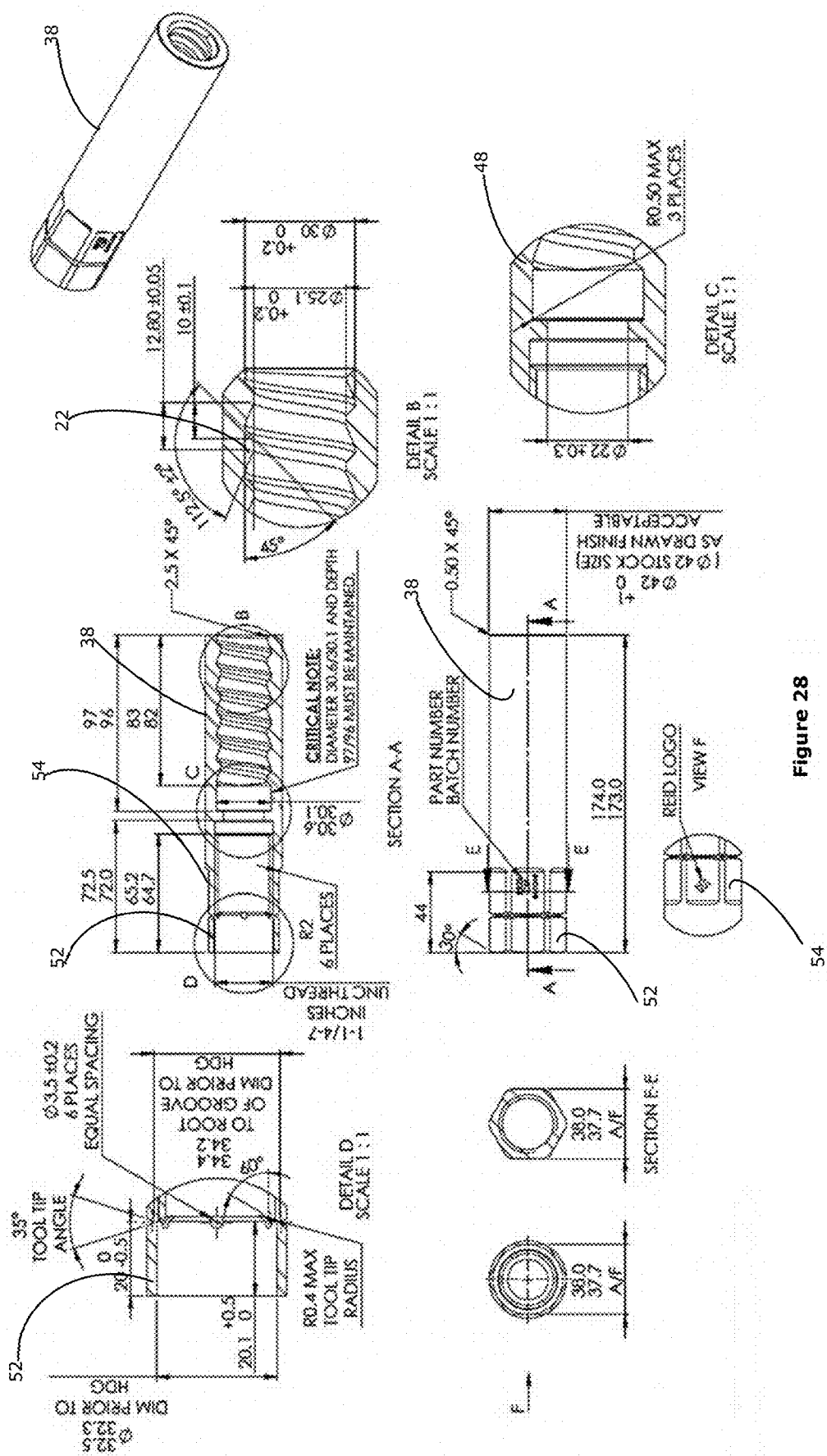

FIG. 28 discloses a female reinforcing bar joiner component 38 having an asymmetric thread form 22 in which the thread has an inner diameter of 25.1 mm and an outer diameter of 30 mm, as shown. The inner ramped portion 26 is at an angle of 45° to a central axis of the female reinforcing bar joiner component 38, whereas the outer ramped portion 24 is at an angle of 112.5° to the inner ramped portion 26, meaning that the outer ramped portion 24 is at an angle of 22.5° to the central axis (the angle of 22.5° being less than the angle of 45° to facilitate a wedging effect so as to meet slip performance criteria in an improved manner). The female reinforcing bar joiner component 38 is provided with a shear nut 52 which is formed with a frangible portion which shears when the female reinforcing bar joiner component 38 is threaded onto externally threaded reinforcing bar 14 to a desired torque, to facilitate installation and to provide a simple torque indication. The female reinforcing bar joiner component 38 is also provided with an external nut formation 54 to facilitate external gripping of the female reinforcing bar joiner component 38 by a tool to control rotation of the female reinforcing bar joiner component 38. The external nut formation 54 may be recessed within an outer diameter of the female reinforcing bar joiner component 38 (to save material), or, alternatively, may protrude radially outwardly beyond the outer diameter of the female reinforcing bar joiner component 38 as shown in FIG. 5. The female reinforcing bar joiner component 38 is provided with a metric female thread 36 for coupling to the first component 30 of FIG. 27.

Figure 29:
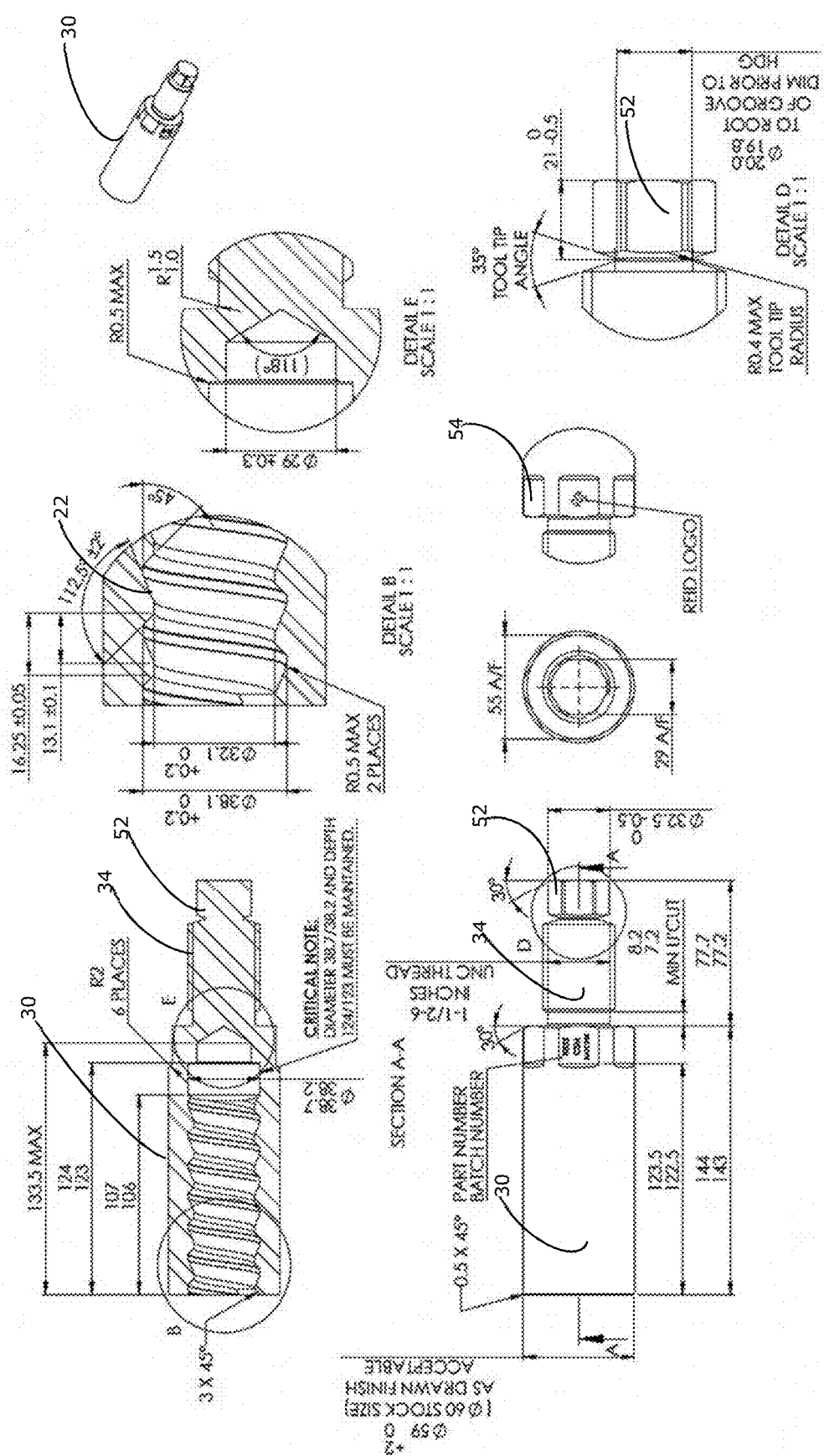

FIG. 29 discloses a male first component 30 having an asymmetric thread form 22 in which the thread has an inner diameter of 32.1 mm and an outer diameter of 38.1 mm, as shown. The inner ramped portion 26 is at an angle of 45° to a central axis of the male first component 30, whereas the outer ramped portion 24 is at an angle of 112.5° to the inner ramped portion 26, meaning that the outer ramped portion 24 is at an angle of 22.5° to the central axis (the angle of 22.5° being less than the angle of 45° to facilitate a wedging effect so as to meet slip performance criteria in an improved manner). The male first component 30 is provided with a shear nut 52 which is formed with a frangible portion which shears when the first component 30 is threaded onto externally threaded reinforcing bar 14 to a desired torque, to facilitate installation and to provide a simple torque indication. The first component 30 is also provided with an external nut formation 54 to facilitate external gripping of the first component 30 by a tool to control rotation of the first component 30. The external nut formation 54 may be recessed within an outer diameter of the first component 30 (to save material), or, alternatively, may protrude radially outwardly beyond the outer diameter of the first component 30 as shown in FIG. 5. The first component 30 is provided with a connecting part 34 in the form of a metric male thread for coupling to the female reinforcing bar joiner component 38 of FIG. 30.

Figure 30:
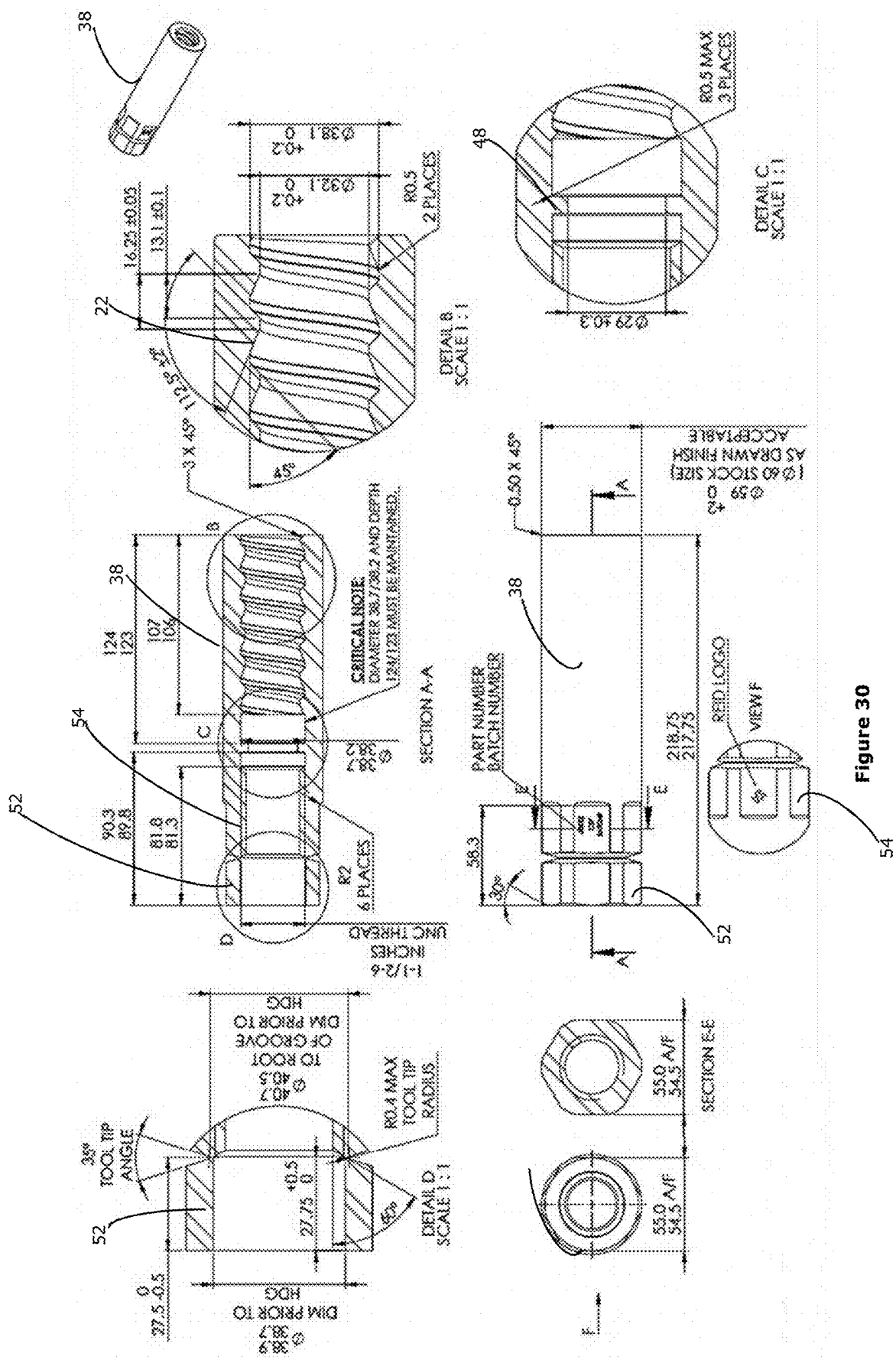

FIG. 30 discloses a female reinforcing bar joiner component 38 having an asymmetric thread form 22 in which the thread has an inner diameter of 32.1 mm and an outer diameter of 38.1 mm, as shown. The inner ramped portion 26 is at an angle of 45° to a central axis of the female reinforcing bar joiner component 38, whereas the outer ramped portion 24 is at an angle of 112.5° to the inner ramped portion 26, meaning that the outer ramped portion 24 is at an angle of 22.5° to the central axis (the angle of 22.5° being less than the angle of 45° to facilitate a wedging effect so as to meet slip performance criteria in an improved manner). The female reinforcing bar joiner component 38 is provided with a shear nut 52 which is formed with a frangible portion which shears when the female reinforcing bar joiner component 38 is threaded onto externally threaded reinforcing bar 14 to a desired torque, to facilitate installation and to provide a simple torque indication. The female reinforcing bar joiner component 38 is also provided with an external nut formation 54 to facilitate external gripping of the female reinforcing bar joiner component 38 by a tool to control rotation of the female reinforcing bar joiner component 38. The external nut formation 54 may be recessed within an outer diameter of the female reinforcing bar joiner component 38 (to save material), or, alternatively, may protrude radially outwardly beyond the outer diameter of the female reinforcing bar joiner component 38 as shown in FIG. 5. The female reinforcing bar joiner component 38 is provided with a metric female thread 36 for coupling to the first component 30 of FIG. 29.

Figure 31:
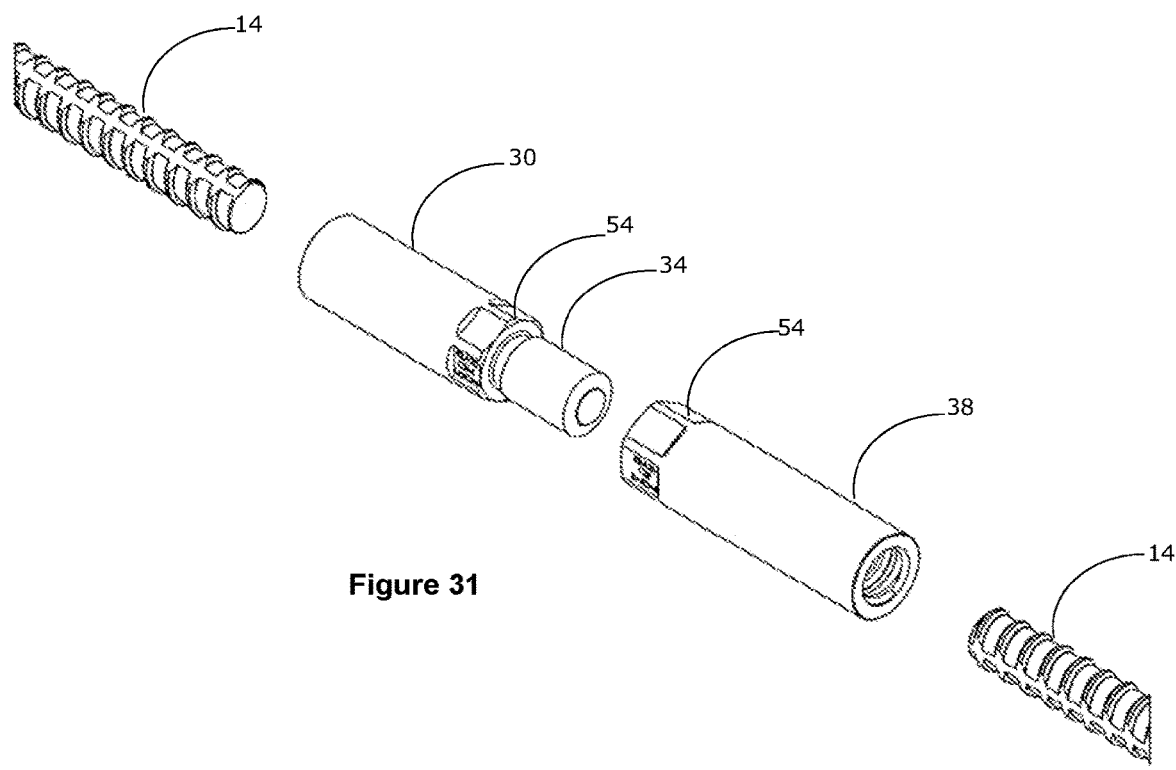
FIGS. 31 to 37 show detail of coupling two reinforcing bars using a first component and a second component in the form of a reinforcing bar joiner component.
Figure 32:
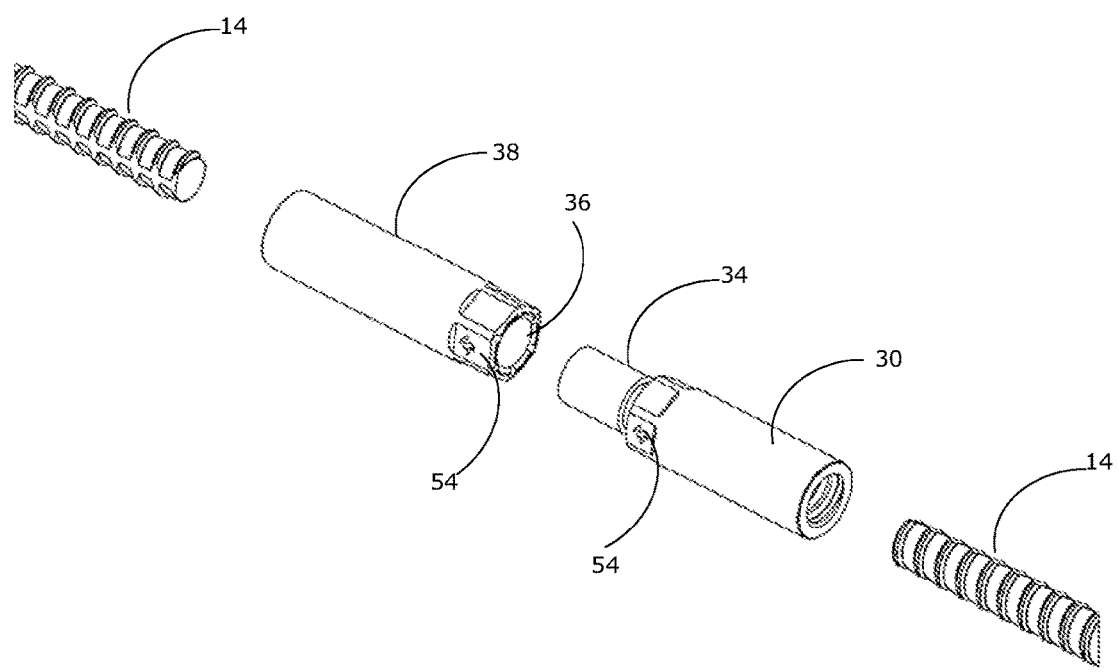
Figure 33:
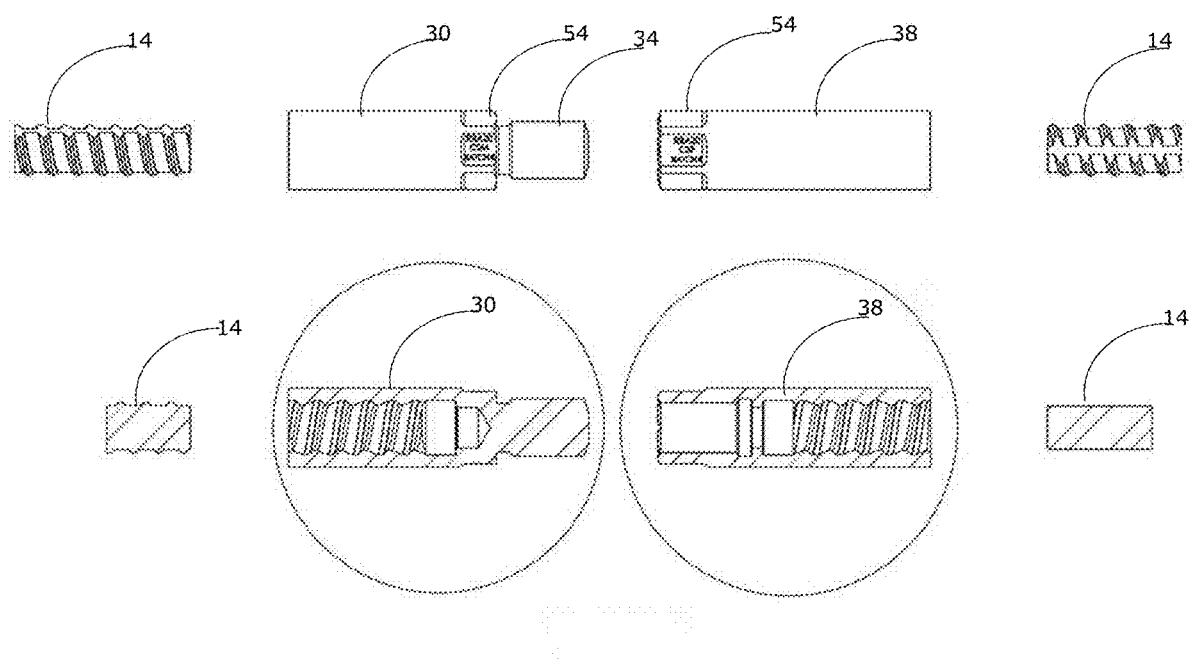
Figure 34:
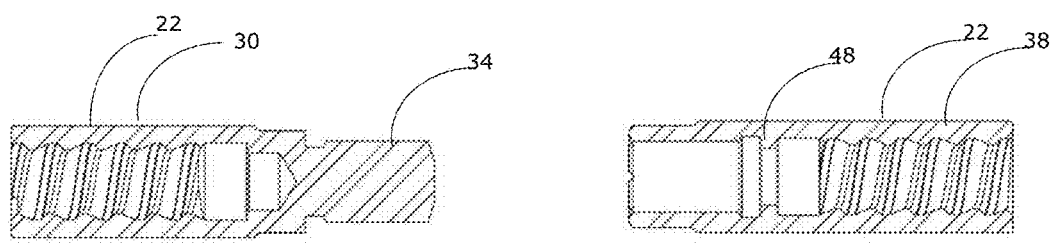

FIGS. 31 to 37 show detail of coupling two reinforcing bars 14 using a first component 30 and a second component 32 in the form of a reinforcing bar joiner component 38. In particular, FIG. 31 shows a perspective view of two reinforcing bars 14 prior to being threaded into a first component 30 and a second component 32 in the form of a reinforcing bar joiner component 38. FIG. 32 shows an opposite perspective view of the arrangement shown in FIG. 31. FIG. 33 shows a side view of the arrangement shown in FIGS. 31 and 32, as well as a detailed cross sectional view of the first component 30, the reinforcing bar joiner component 38 and the two lengths of reinforcing bar 14. In FIG. 34, there is shown a further cross sectional view of the first component 30 and the reinforcing bar joiner component 38, prior to coupling, and illustrating detail of the asymmetric thread form 22 in each of these components 30, 38.

Figure 35:
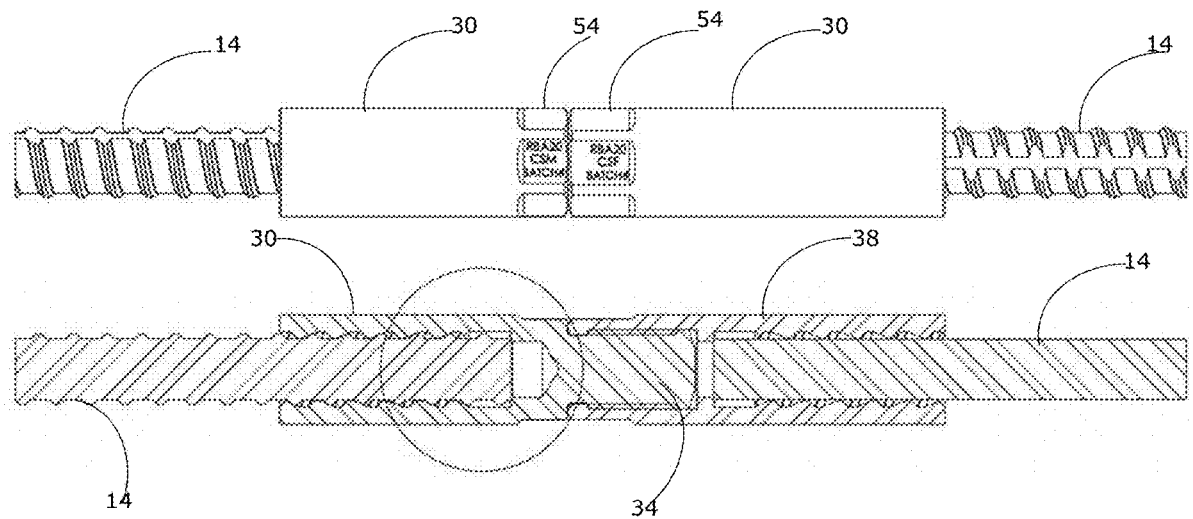

With reference to FIG. 35, the first component 30 is threaded onto one length of reinforcing bar 14, the reinforcing bar joiner component 38 is threaded onto the other length of reinforcing bar 14, then the first component 30 is threaded into the reinforcing bar joiner component 38 by way of the corresponding metric threads of the connecting part 34 (of the first component 30) and the female thread 36 (of the reinforcing bar joiner component 38). FIG. 35 shows the arrangement once coupled in a side view and in a cross-sectional view below. The external nut formation 54 on the first component 30 and the external nut formation 54 on the reinforcing bar joiner component 38 may be used by way of engagement with a tool for both threading of each component 30, 38 onto the respective length of reinforcing bar 14 as well as for threading the components together.

Figure 36:
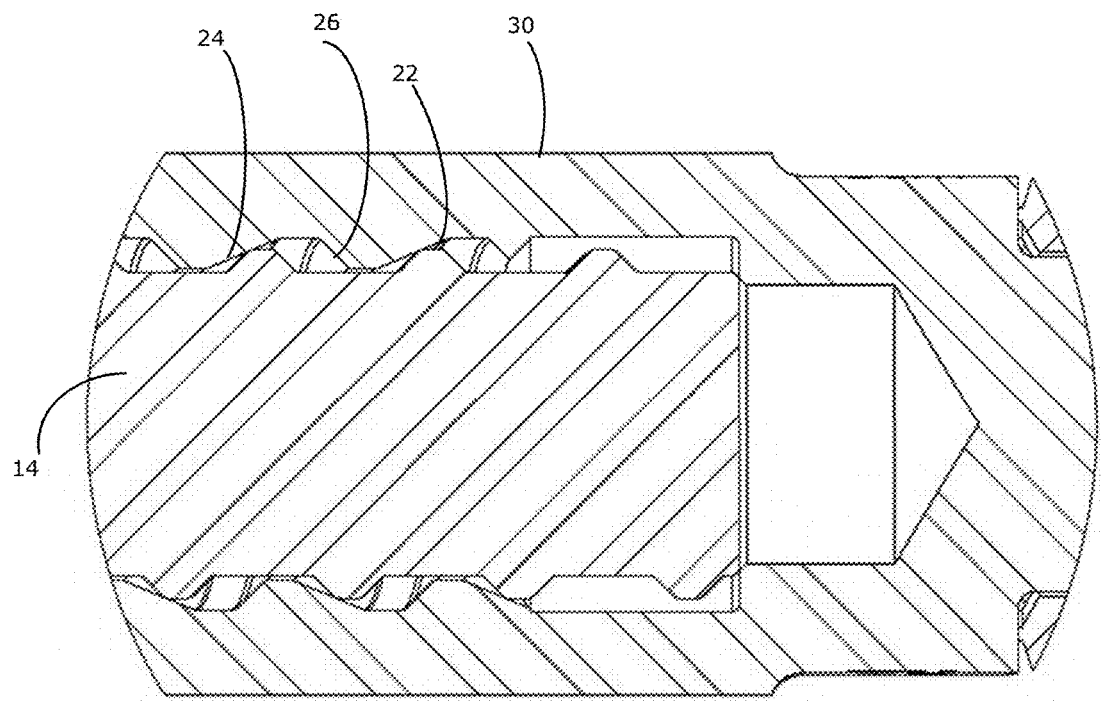
Figure 37:
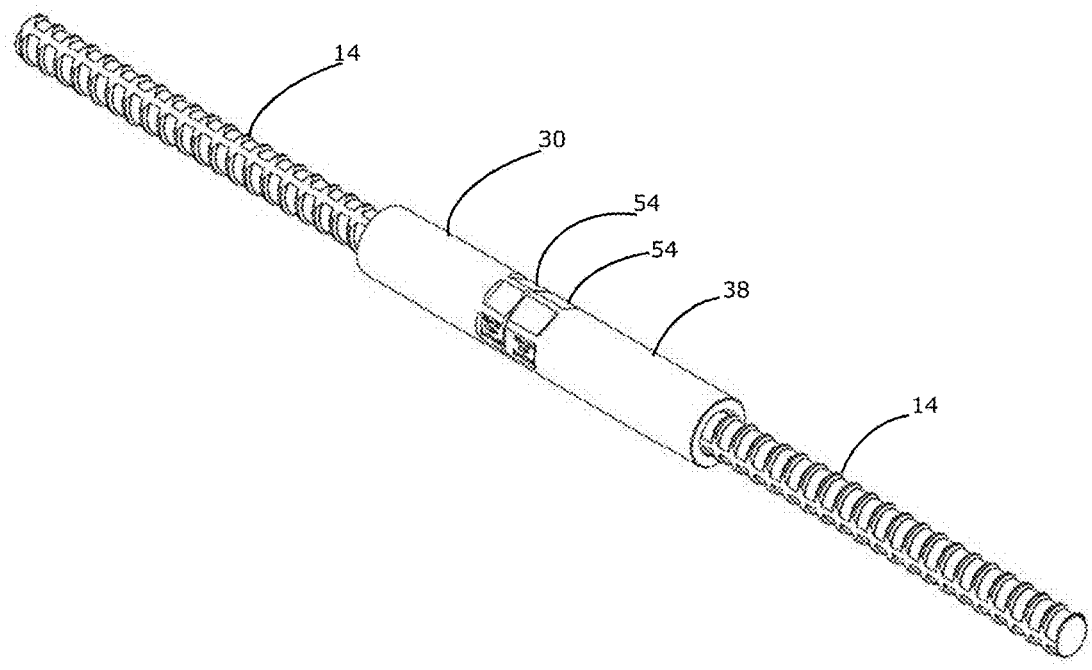

FIG. 36 shows cross sectional detail of the engagement of the reinforcing bar 14 in the first component 30 from FIG. 35. Advantageously, by way of the inner ramped portion 26 being angled at a smaller magnitude to a central axis than the outer ramped portion 24, there is facilitated a wedging of the reinforcing bar 14 against the inner ramped portion 26 so as to provide a firm coupling which meets anti-slip requirements. FIG. 37 shows a further perspective view of the two lengths of reinforcing bar 14 coupled together by way of the first component 30 and the second component 32 in the form of the reinforcing bar joiner component 38.

Figure 38:
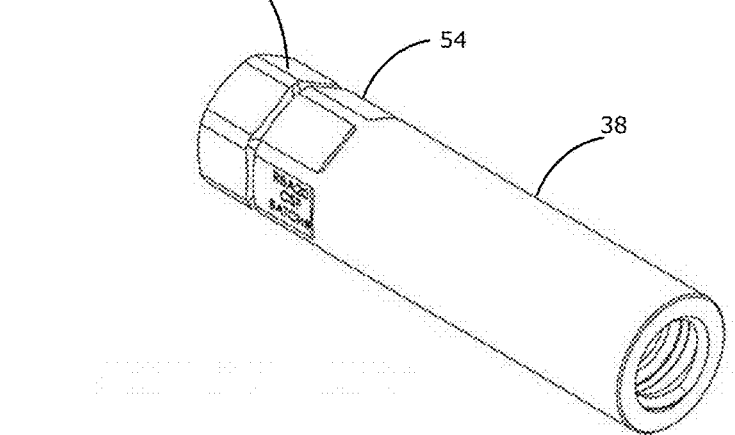
FIG. 38 shows perspective, side and cross-sectional views of the reinforcing bar joiner component.
Figure 38:
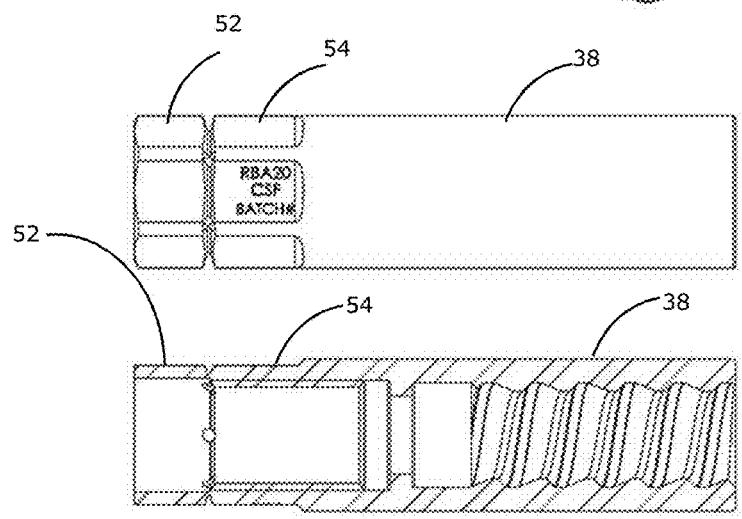

With reference to FIG. 38, there are shown perspective, side and cross-sectional views of the reinforcing bar joiner component 38 having a shear nut 52. The shear nut 52 is formed integrally with the remainder of the reinforcing bar joiner component 38 and is coupled to the remainder of the component 38 by a frangible section which is configured to shear when the correct torque is achieved in threading the reinforcing bar joiner component 38 onto the reinforcing bar 14 through application of torque at the shear nut 52. The frangible section may be a section of reduced cross-sectional area and may also be provided with radial holes to facilitate breakage of the frangible section at the desired torque.

Figure 39:
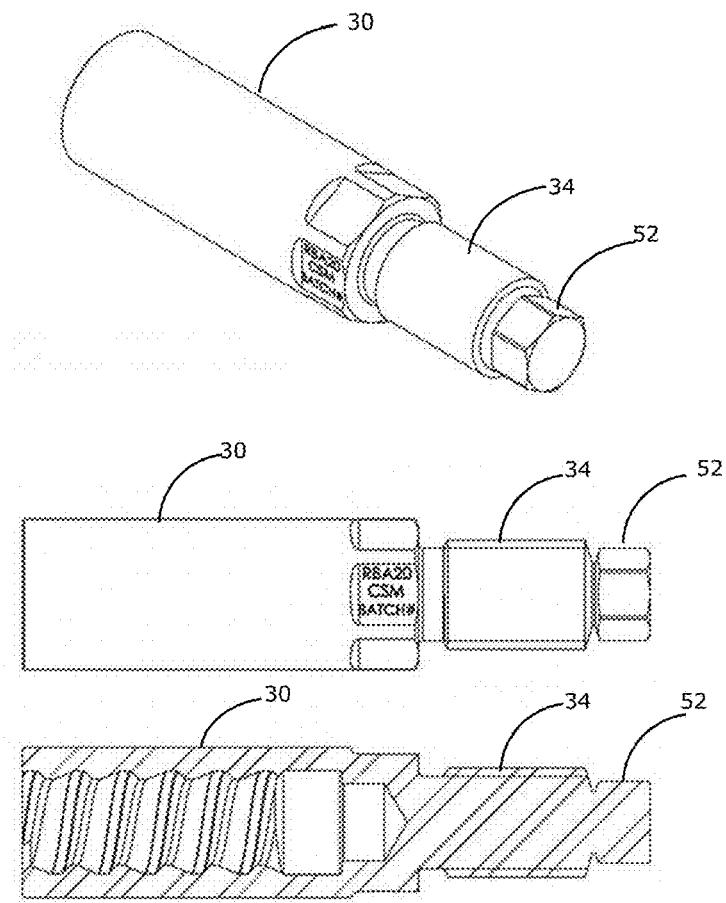
FIG. 39 shows perspective, side and cross-sectional views of the first component.

Turning to FIG. 39, the first component 30 may also be provided with a shear nut 52 which is formed integrally with the remainder of the first component 30. Similarly, the shear nut 52 may be connected to a distal end of the connecting part 34 by a frangible section of reduced cross-sectional area to facilitate breakage of the frangible section when the correct torque is achieved in threading the first component 30 onto the reinforcing bar 14.

Figure 40:
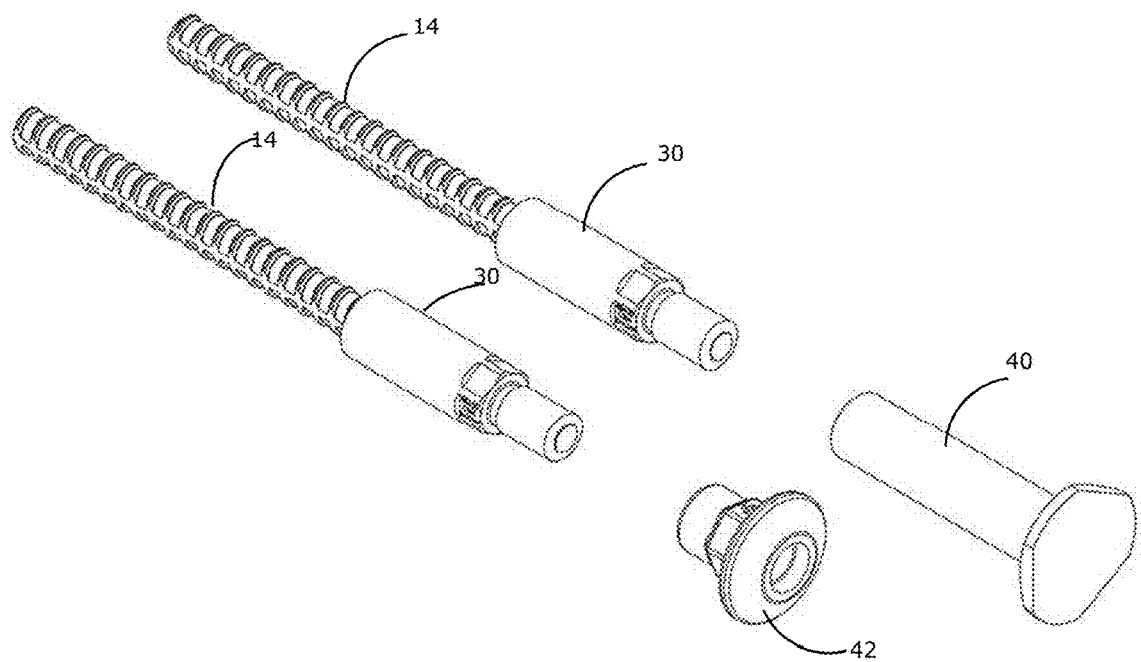
FIG. 40 shows coupling of a reinforcing bar to alternative second components in the form of a threaded insert component and a flange nut component.
Figure 41:
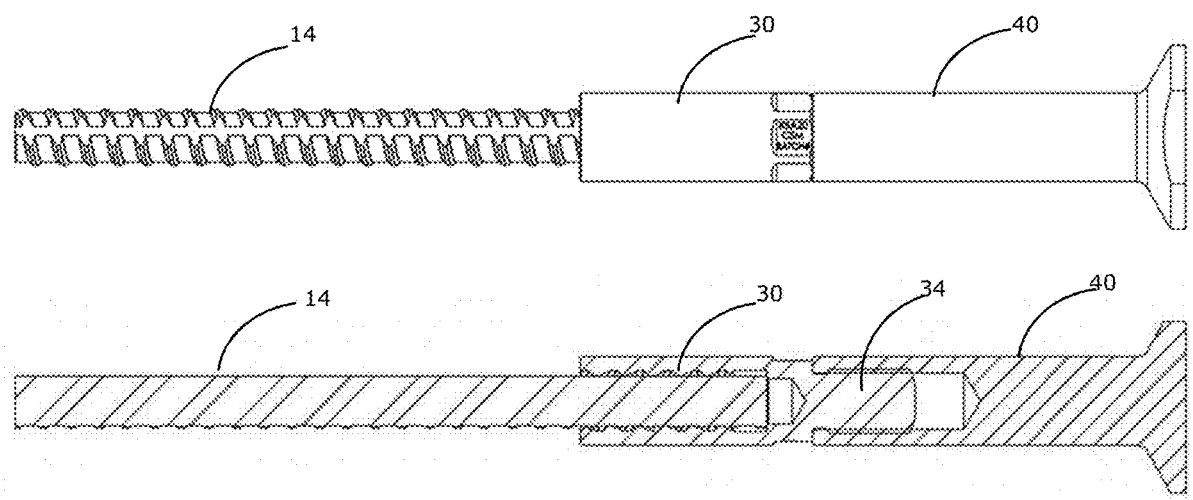
FIG. 41 shows a side view and a cross-sectional view of the reinforcing bar coupled to the threaded insert component.
Figure 42:
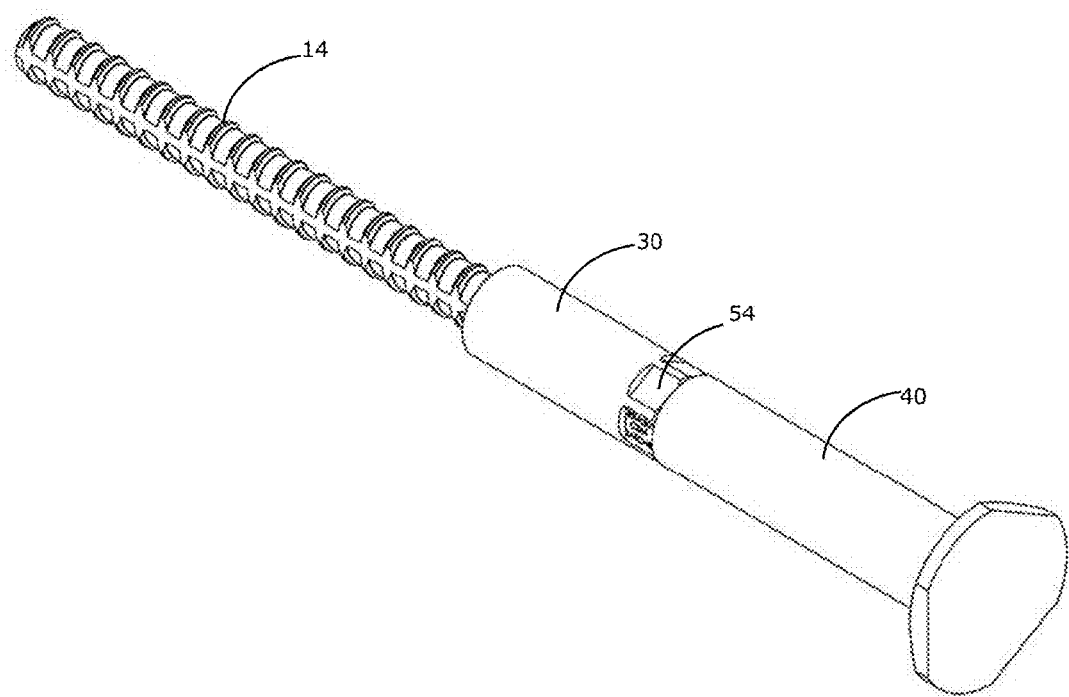
FIG. 42 shows a perspective view of the reinforcing bar coupled to the threaded insert component.

FIG. 40 shows coupling of a reinforcing bar 14 via the first component 30 to alternative forms of second component 32. In particular, there is shown coupling to a threaded insert component 40 (which may be embedded in concrete) and coupling to a flange nut component 42. FIGS. 41 and 42 show detail of the coupling of the reinforcing bar 14 to the threaded insert component 40 via the first component 30. As can be seen, this is achieved by way of the threaded insert component 40 having a metric female thread which corresponds to the metric thread of the male connecting part 34. The threaded insert component 40 may have an enlarged end with flattened side edges (for example, of generally triangular configuration as shown in FIG. 42) to resist rotation of the threaded insert component 40 within set concrete.

Figure 43:
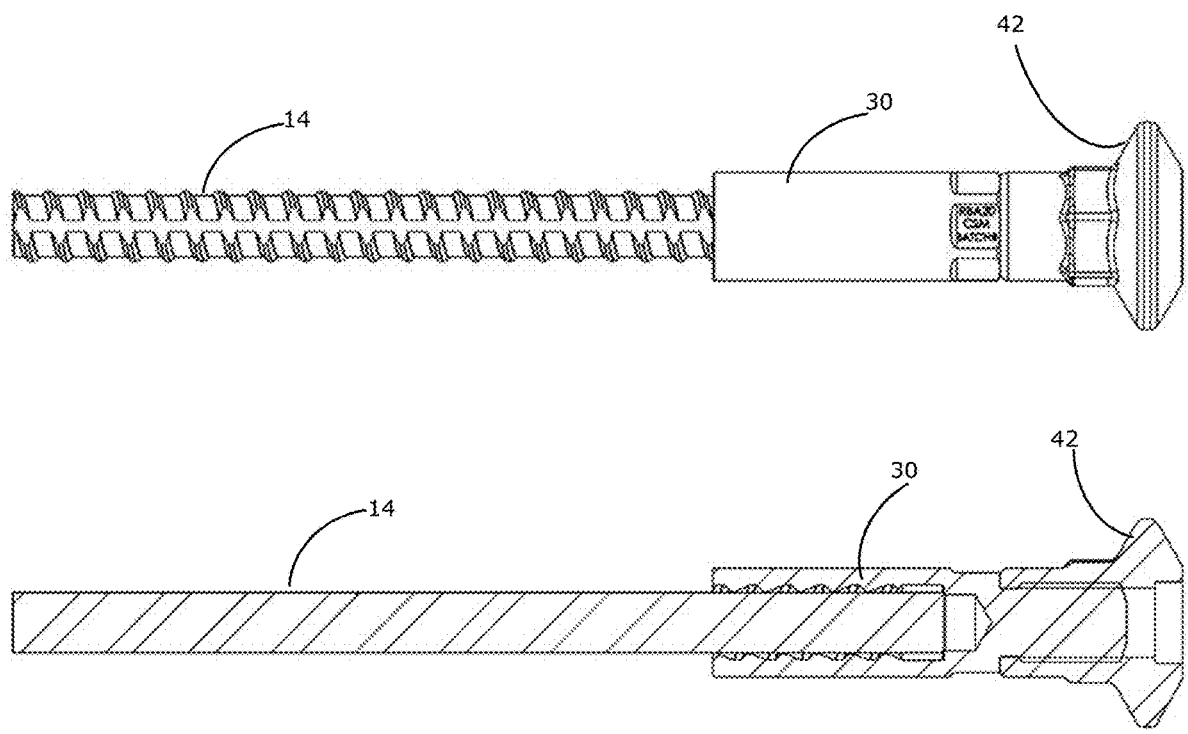
FIG. 43 shows a side view and a cross-sectional view of the reinforcing bar coupled to the flange nut component.
Figure 44:
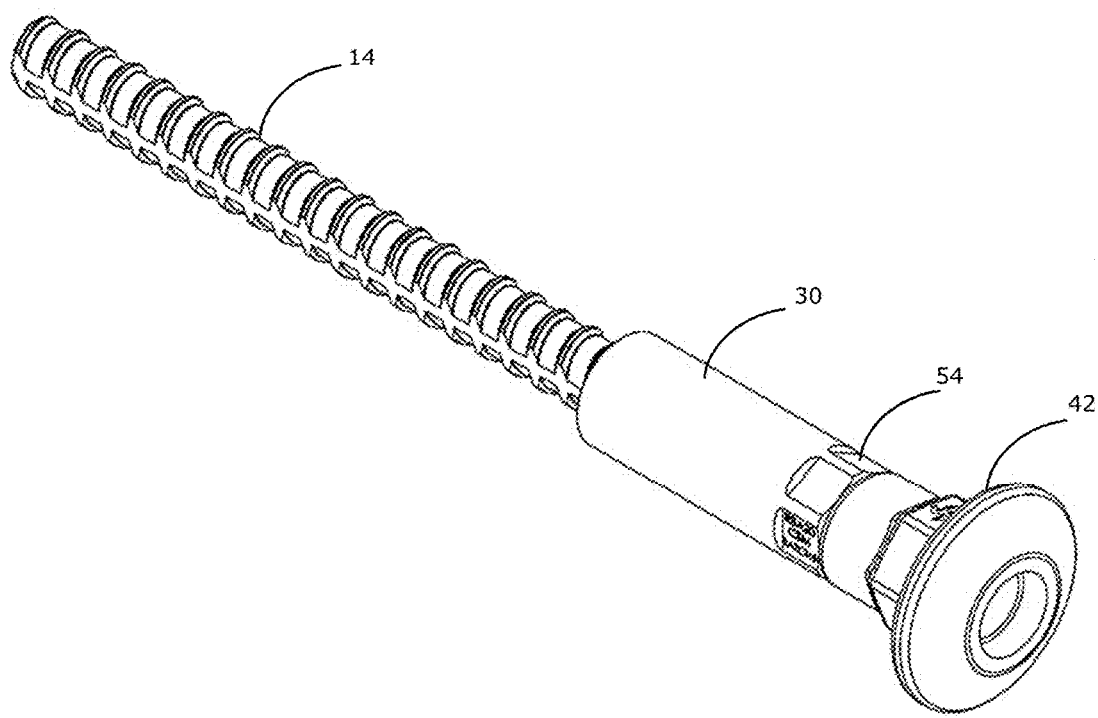
FIG. 44 shows a perspective view of the reinforcing bar coupled to the flange nut component.

With reference to FIG. 43 and FIG. 44, there is shown detail of the reinforcing bar 14 connected to the flange nut component 42 by way of the first component 30. As can be seen, this is achieved by way of the flange nut component 42 having a metric female thread which is correspondingly threaded to the male connecting part 34 of the first component 30. The flange nut component 42 may be provided with a nut formation to facilitate gripping of the flange nut component 42 by a tool for controlling rotation of the flange nut component 42 during threading onto the first component 30.

Figure 45:
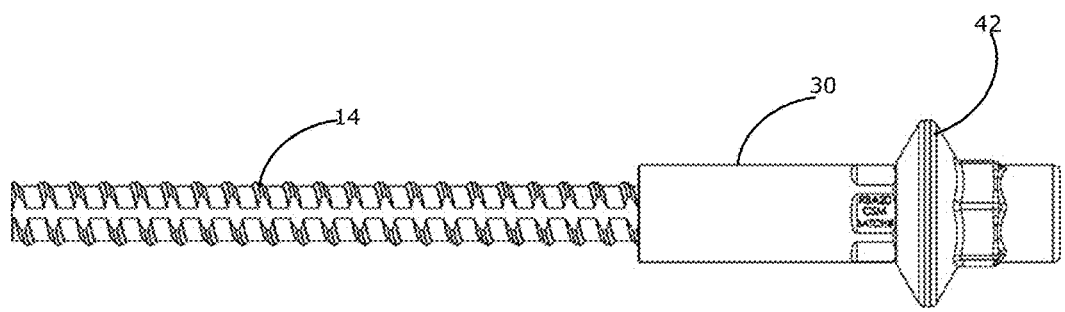
FIG. 45 shows a side view and a cross-sectional view of the reinforcing bar coupled to the flange nut component, with the flange nut component in a reversed configuration.
Figure 45:
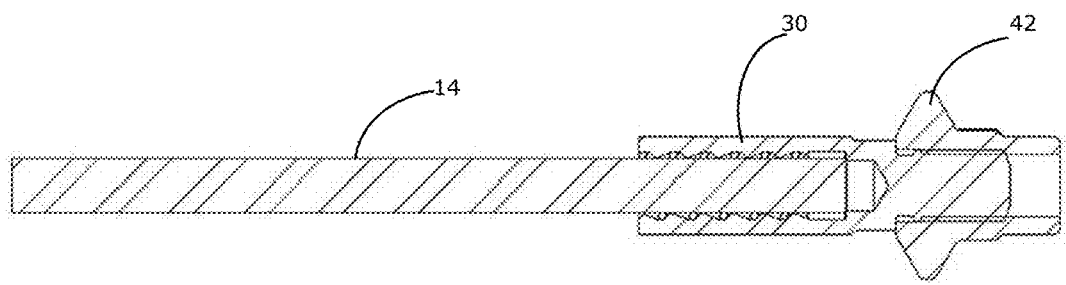
Figure 46:
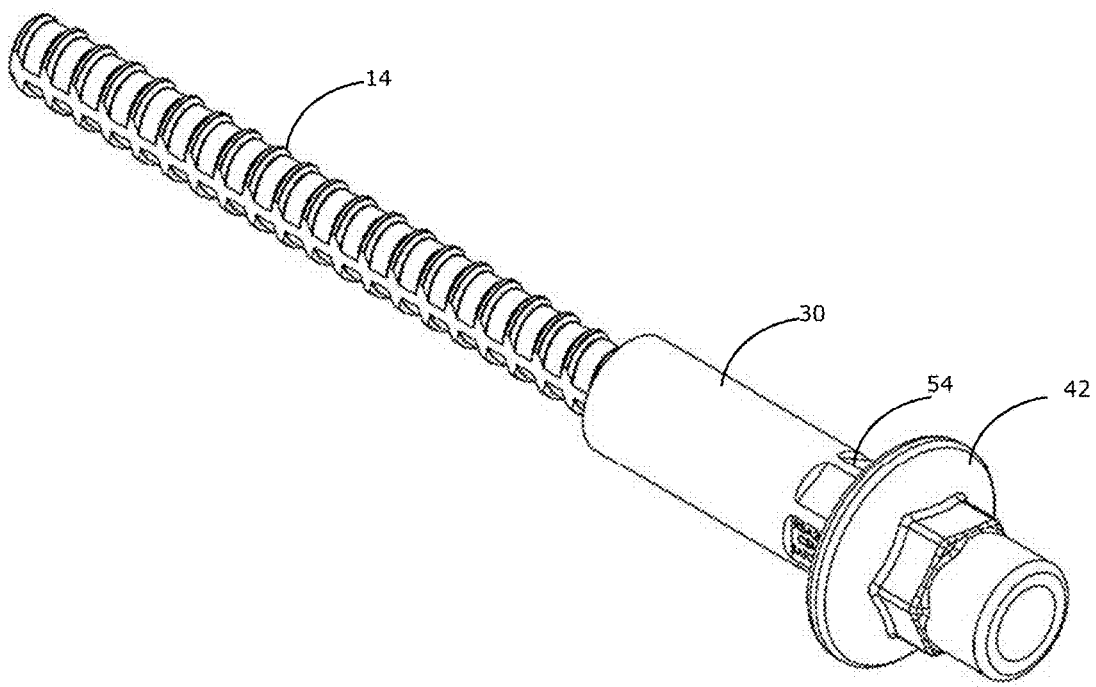
FIG. 46 shows a perspective view of the reinforcing bar coupled to the flange nut component in the reversed configuration of FIG. 45.

As can be seen in FIG. 45 and FIG. 46, the flange nut component 42 may be reversed in orientation prior to threading onto the first component 30 to achieve an alternative configuration as may be desired.

Accordingly, it will be appreciated from the above that the present disclosure relates to a coupler 10 for mounting to externally threaded reinforcing bar 14 to form a mechanical connection for use in concrete construction. The coupler 10 has a fitting 12 including a body 16 having a portion with an internal thread 18 for engagement with the thread of the reinforcing bar 14. In one form (see FIG. 11), the coupler 10 has a body in which ends of adjacent sections of reinforcing bars can be received. The body has an internal thread 18 formed therein and an internal stop 48 or stand against which ends of the adjacent sections of reinforcing bar 14 can abut. The coupler 10 is formed with hexagonal formations (or the like) to permit gripping by a spanner or wrench. Hexagonal formations also allow the installer to use tooling—for example, socket attachments—capable of achieving higher torques than a spanner or wrench when either half of the coupler is installed on to ReidBar. Advantageously, the hexagonal formations may also enable direct measurement of a torque applied using appropriate equipment. In one form, the coupler 10 is formed by a process of extrusion of high tensile steel with the internal threads being formed by machining. This tensile steel may have a higher Ultimate Tensile Stress & Hardness rating than the reinforcement bar.

To minimise slippage of the bar and the fitting, the internal thread profile of the coupler 10 is asymmetrical and does not match the thread profile of the corresponding reinforcing bar 14. The outer flank (outer ramped portion 24), i.e. the flank further from the stand 48, has a more acute angle than the inner flank (inner ramped portion 26) and the flanks on the reinforcing bar 14.

When the bar 14 is engaged in the coupler 10 and tightened against the coupler's stand 48, the crest 46 of the thread 20 of the bar 14 will engage with this acute outer flank 24, creating frictional engagement between the outer flank 24 of the coupler 10 and the crest adjacent to the outer flank of the bar 14. This contact will be more like a line contact rather than a face contact. When this frictional engagement occurs, and the assembly is tightened further by torque, the crest 46 will be pushed further into this ramp 24, locking it in place. Some material may be removed from the crest 46 of the thread 20 of the bar 14, increasing surface contact and/or allow for other threads along the bar to frictionally engage with the coupler's outer flanks. The applicant has determined that this will prevent slippage or at least minimise slippage to within the required standard. With the contact initially being more like a line contact, this allows for a lower tightening torque to achieve these results.

As the internal thread 18 within the coupler 10 is machined from steel, the thread 18 has a better surface finish and a higher hardness than the reinforcement bar 14. This minimises slippage due to embedment, which is common in other embodiments of couplers i.e. cast-iron couplers.

Another feature of the coupler's thread profile (thread form 22), is that due to ramping effect of the bar's threads 20 being pulled into the acute angled flanks 24, the bar 14 centralises within the coupler 10 and minimises lateral movement of the bar 14. This minimises the assembly loosening due to vibration and/or dynamic load. Therefore, it does not require extra locking devices.

Examples of the present disclosure provide a unique thread configuration to the reinforcement connections industry. The thread form 22 is asymmetric with tightly controlled tolerances on its form, being configured to screw directly on to externally threaded reinforcing bar without thread modification. This asymmetric thread form features a 'ramp' like portion (outer ramped portion 24) which creates a line contact with the externally threaded reinforcing bar 14. When the coupler 14 is tightened against this 'ramp' the crest 46 of the thread 20 is pushed further into the ramp 24 until sufficient surface area contacts between the female and male thread form which creates a mating load bearing surface along the thread and improves performance of the system by reducing slip (see FIG. 2).

As can also be seen in FIG. 2, the coupler 10 may be provided with an internal stop 48 and an open section at base of internal thread which allows the bar to be torqued up to this internal stop 48 to a set value.

Figure 3:
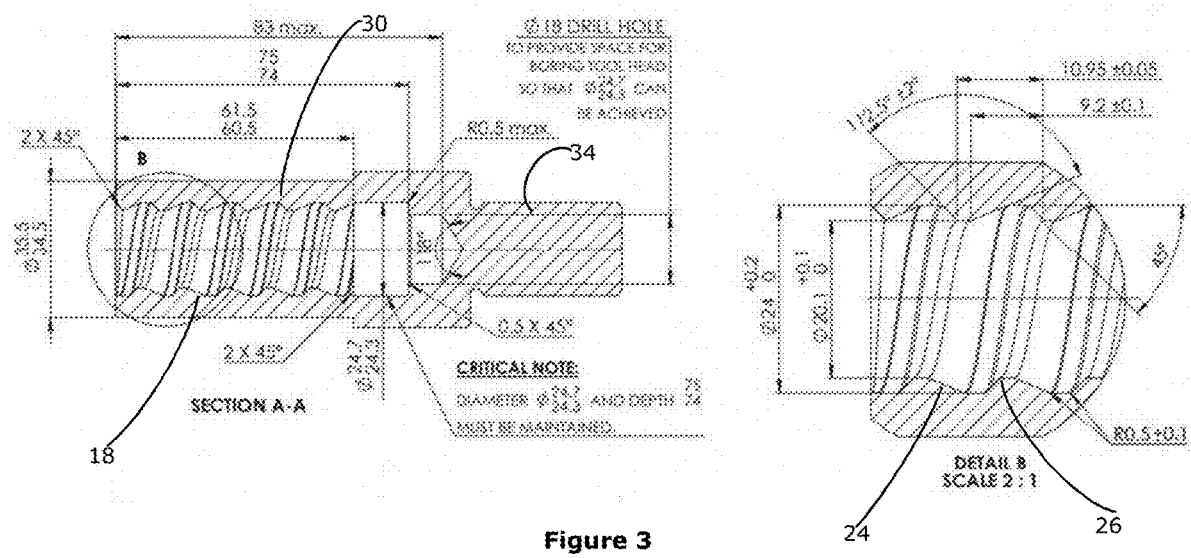
FIG. 3 shows cross-sectional detail of a modular coupler in accordance with an example of the present disclosure.
Figure 4:
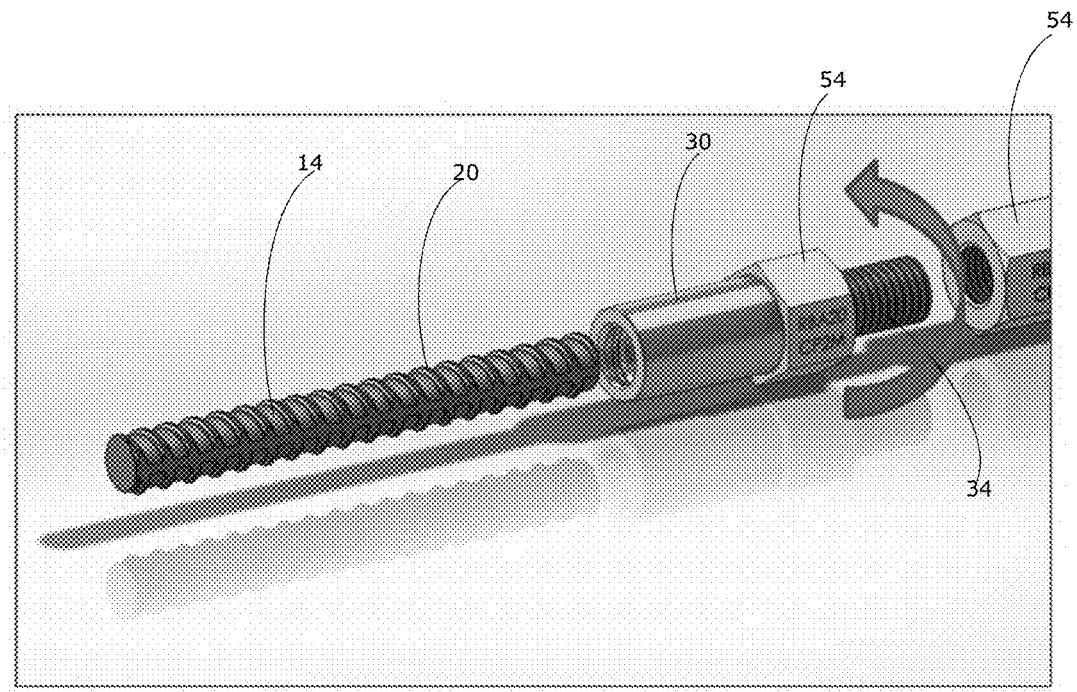
FIG. 4 shows detail of a modular coupler being connected to an externally threaded reinforcing bar.

With reference to FIG. 3 and FIG. 4, there is shown a split coupler configuration with a hexagonal form on an exterior to allow: (a) one half of the coupler to be correctly torqued on to the externally threaded reinforcing bar using a full socket and appropriate tool to meet and control torque requirements for slip performance (whereas traditional use of an adjustable wrench to secure the coupler 10 makes it difficult to measure and control the assembly torque as well as not being practical to achieve higher torque settings (see FIG. 4)); and (b) unique modularity and interchangeability between system components. This also allows the product system to be expanded in the future with new reinforcement components to join to the coupler system (see FIG. 5).

The coupler 10 may be provided with an uncommon thread (derived to be deliberately unique and incompatible with existing threads) between coupler halves and accessories to prevent non-proprietary products being attached to the coupler half. Non-proprietary products being connected to the coupler half pose a safety and compliance risk as the system as installed is no longer engineered or validated.

Figure 6:
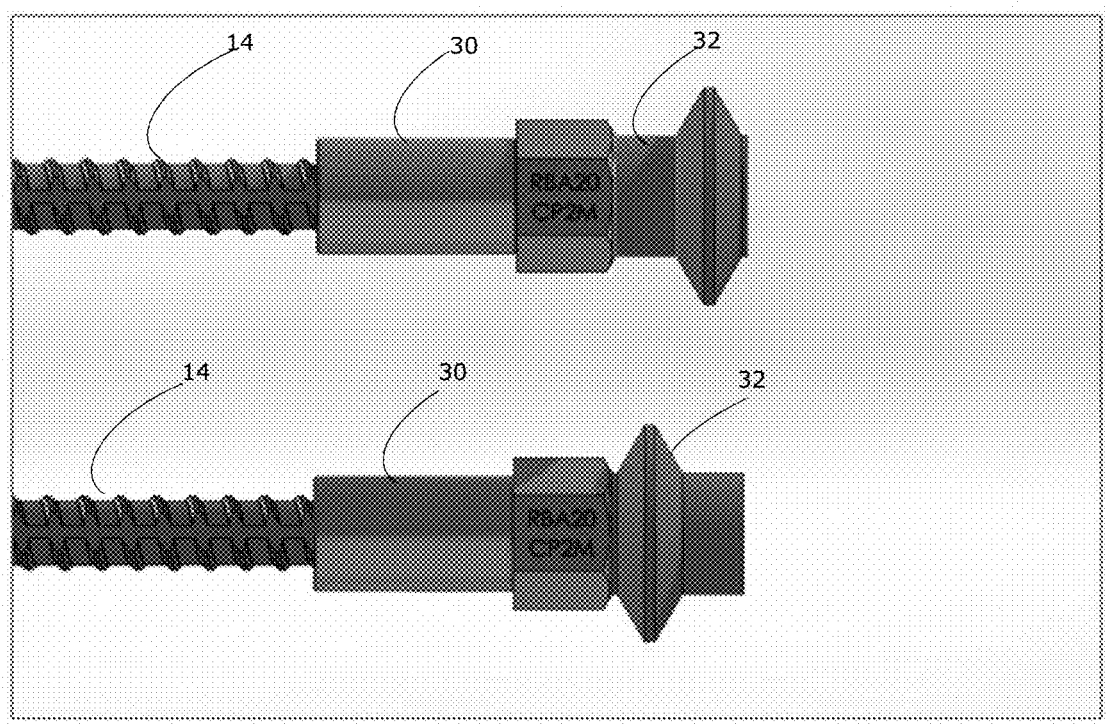
FIG. 6 shows connection to a tapered foot in the form of a flange nut forming a mechanical cast-in anchor which is able to be flipped to attain a different anchor position.
Figure 7:
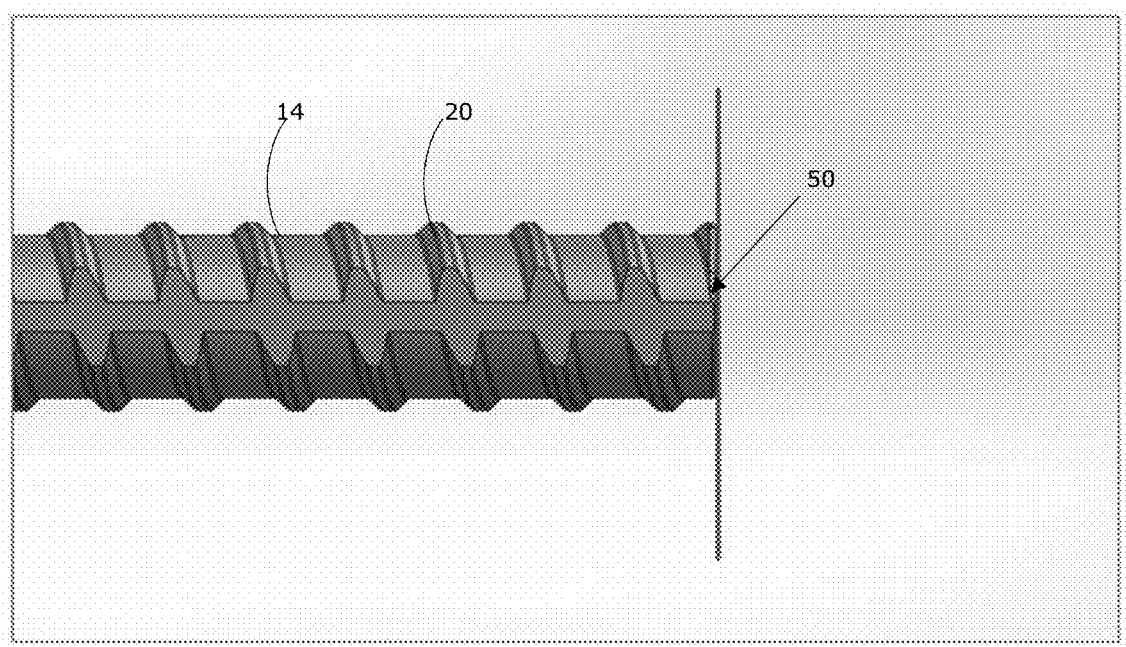
FIG. 7 shows detail of a threaded reinforcing bar being cut square for use with the coupler.
Figure 8:
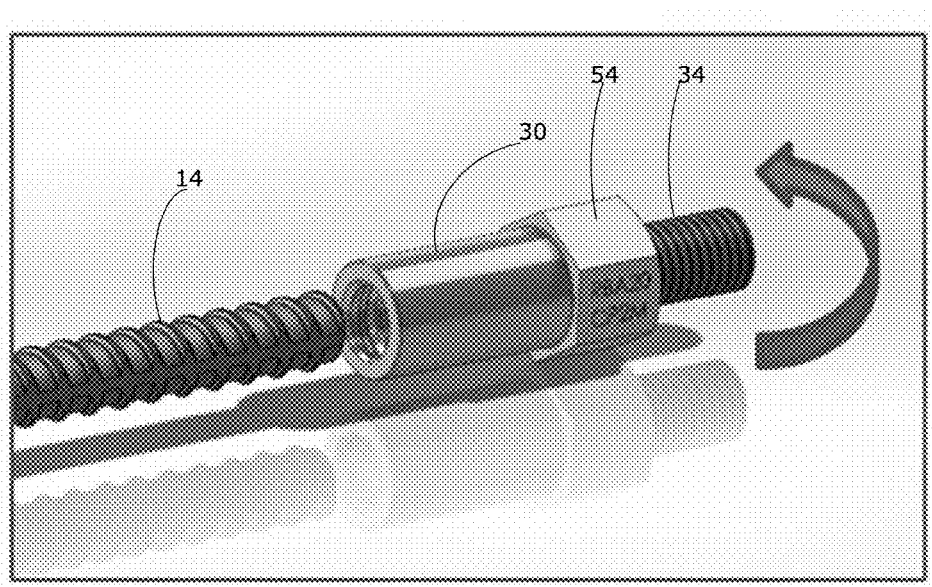
FIG. 8 shows threading of a first component of the coupler onto a first threaded reinforcing bar.
Figure 9:
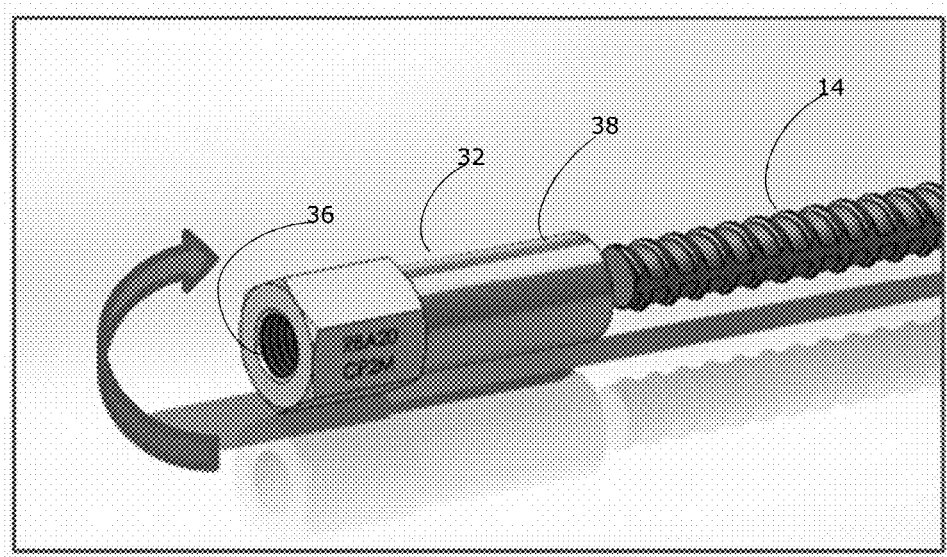
FIG. 9 shows threading of a second component of the coupler onto a second threaded reinforcing bar.
Figure 10:
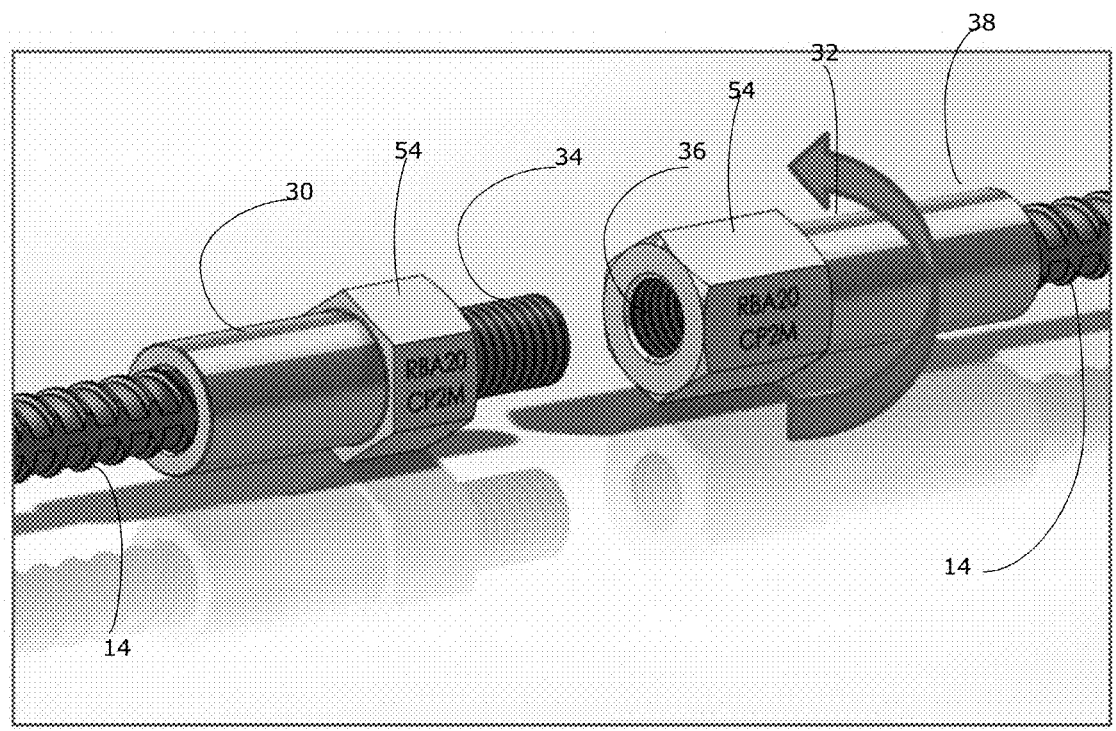
FIG. 10 shows threaded connection of the first component and the second component.
Figure 11:
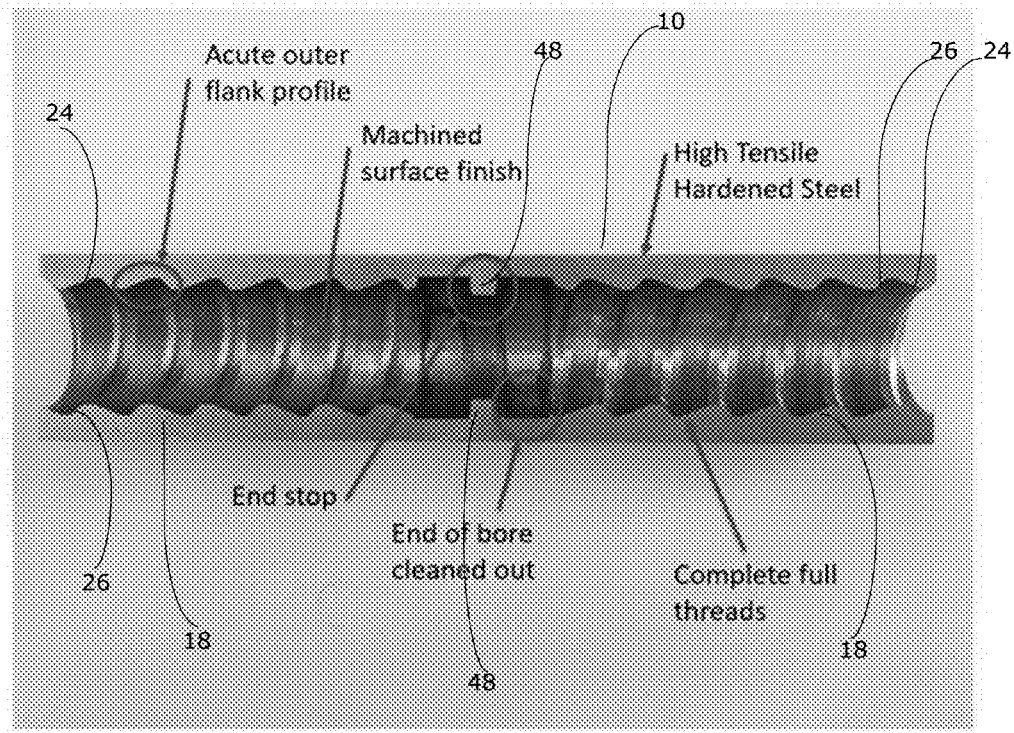
FIG. 11 shows a cutaway view of a unitary coupler for coupling together two reinforcing bars.

As shown in FIG. 6, a flange nut accessory 42 can be orientated either way (that is, flipped) to assist with packaging of reinforcement within concrete.

In one example, the product system covers the following sizes of externally threaded reinforcing bar: RB12, RBA16, RBA20, RB20, RB25, and RB32.

The product system may be assembled according to the following steps: (i) cutting the corresponding externally threaded reinforcing bar to be joined square (see FIG. 7); (ii) torqueing one half of each coupler to the required value on to each reinforcing bar to be connected (see FIG. 8 and FIG. 9); and (iii) joining each coupler half by the fine threads and tightening such as by using a conventional wrench (see FIG. 10). In the case of attaching to a flange nut or a threaded insert for a mechanical cast-in anchor, the first half of the coupler is torqued onto the reinforcing bar and the threaded insert is attached to the coupler half using a conventional wrench (see FIG. 5).

The advantages of various examples of the present disclosure are that the coupler: is easier to use and saves time for the customer but still meets slip performance criteria as set out by the relevant construction standards.

By utilizing the deformed rib on the bar 14 to thread the connection, the bar 14 ends do not have to be processed i.e. enlarged ends by cold working and/or threads machined by the customer. Therefore, it does not require any specialist equipment for processing. This makes it quicker and simpler for the customer when compared to existing products.

As the deformed rib runs the full length of the bar 14, the customer can use the entire length of the bar 14. Waste is reduced and makes the system more adaptable than alternative options which do not use the coarse thread of the reinforcement bar 14.

The wedge of the internal female thread wears the crest 46 of the threaded bar 14 until sufficient surface area contacts between the female and male thread form. This creates mating load bearing surfaces and improves performance by reducing slip.

By mating on the outer rib 46 of the male thread 20 with the wedge-like flank 24, this centres the bar 14 within the fitting and limits lateral movement. This improves performance by reducing slip.

Advantageously, various examples of the present disclosure require less torque than competitor coarse thread couplers, making the coupler easier and quicker to assemble for the customer.

The configuration eliminates the need for other locking devices e.g. lock nuts. This makes the coupler quicker and simpler for the customer.

The configuration may provide free spinning until the bar 14 hits the end stop 48, so can be easily assembled by hand.

To be finally tightened, the coupler just requires the use of a standard pipe wrench to apply the tightening torque. The coupler does not require any specialist tools reducing time and complexity.

Advantageously, examples of the present disclosure provide a coupling system to join reinforcing bar within concrete structures, allowing continuous reinforcement between precast concrete elements and those poured in situ.

The new coupling system has a number of key advantages including: (a) no modification or potential weakening of externally threaded reinforcing bar required to install. Externally threaded reinforcing bar can be cut and a coupler can be screwed on and torqued; (b) no weakening of continuous reinforcement system, installed joint strength is greater than bar strength; (c) can be offered pre-assembled on to externally threaded reinforcing starter bars for sale to customers; (d) once the system is installed correctly and torqued, it meets slip requirements detailed in, AS 3600:2018 Clause 13.2.6, NZS 3101:2006 (A3) Clause 8.7.5.2 (b), ISO 15835-

1:2009 Clause 5.4 and ISO 15835-1:2018 Clause 5.4, without the use of additional lock nuts, epoxy or thread locking compound; (e) modular interchangeability with accessories including but not limited to Threaded Inserts and Flange Nuts.

The embodiments have been described by way of example only and modifications are possible within the scope of the invention disclosed.

LIST OF NUMBERED FEATURES

Coupler 10
Fitting 12
Externally threaded reinforcing bar 14
Body 16
Internal thread 18
Thread of the reinforcing bar 20
Asymmetric thread form 22
Outer ramped portion 24
Inner ramped portion 26
Central axis 28
First component 30
Second component 32
Connecting part 34
Female thread 36
Reinforcing bar joiner component 38
Threaded insert component 40
Flange nut component 42
Internal thread form 44 of the bar joiner component 38
Outer rib 46
Internal stop 48
End of the reinforcing bar 50
Shear nut 52
External nut formation 54

The invention claimed is:

1. A coupler comprising:
a fitting mountable to an externally threaded reinforcing bar, the fitting including a body having a portion having a first free end that defines an opening configured to receive the reinforcing bar and the portion having a second end spaced from the first free end, the body having an internal thread engageable with the thread of the reinforcing bar, the internal thread extending from the first free end of the portion to the second end of the portion, wherein the internal thread has an asymmetric thread form having an outer ramped portion and an inner ramped portion, the outer ramped portion being inclined to a central axis of the coupler at a first angle, the inner ramped portion being inclined to the central axis of the coupler at a second angle, the first angle being smaller in magnitude than the second angle, wherein the first angle is constant throughout the internal thread from the first free end of the portion to the second end of the portion.

2. The coupler of claim 1, wherein the outer ramped portion is arranged, such that on tightening threaded engagement of the reinforcing bar in the coupler, the external thread of the reinforcing bar is engaged in continuous line contact with the outer ramped portion.

3. The coupler of claim 2, wherein the outer ramped portion is a straight line in cross-section.

4. The coupler of claim 1, wherein the outer ramped portion is a straight line in cross-section.

5. The coupler of claim 1, wherein the coupler is formed of a first component and a second component, the first component having a connecting part configured to connect the first component to the second component.

6. The coupler of claim 5, wherein the second component is chosen from a set of interchangeable second components, each of the second components having a different form configured for a different purpose.

7. A kit for forming a coupler, the kit comprising:
a first component in the form of a fitting mountable to an externally threaded reinforcing bar, the fitting including a body having a portion having a first free end that defines an opening configured to receive the reinforcing bar and the portion having a second end spaced from the first free end, the body having internal thread engageable with the thread of the reinforcing bar, the internal thread extending from the first free end of the portion to the second end of the portion, wherein the internal thread has an asymmetric thread form having an outer ramped portion and an inner portion,
the outer ramped portion being inclined to a central axis of the coupler at a first angle, wherein the first angle is constant throughout the internal thread from the first free end of the portion to the second end of the portion, wherein the externally threaded reinforcing bar is threaded into the internal thread of the coupler and tightened such that the external thread of the reinforcing bar is securely engaged in contact with the outer ramped portion of the internal thread; and
a set of interchangeable second components configured to be interchangeably engaged with the first component.

8. The kit of claim 7, wherein the set of interchangeable second components includes at least one of the following: a reinforcing bar joiner having an internal thread form the same as the thread form of the first component, a threaded insert, a flange nut and a metric joiner.

9. An assembly comprising:
an externally threaded reinforcing bar; and
a coupler including a fitting mountable to an externally threaded reinforcing bar, the fitting including a body having a portion having a first free end that defines an opening configured to receive the reinforcing bar and the portion having a second end spaced from the first free end, the body having an internal thread for engagement with the thread of the reinforcing bar, the internal thread extending from the first free end of the portion to the second end of the portion, wherein the internal thread has an asymmetric thread form having an outer ramped portion and an inner ramped portion, the outer ramped portion being inclined to a central axis of the coupler at a first angle, the inner ramped portion being inclined to the central axis of the coupler at a second angle, the first angle being smaller in magnitude than the second angle, wherein the first angle is constant throughout the internal thread from the first free end of the portion to the second end of the portion,
wherein the externally threaded reinforcing bar is threaded into the internal thread of the coupler and tightened such that the external thread of the reinforcing bar is engaged in continuous line contact with the outer ramped portion of the internal thread.

10. An assembly comprising:
an externally threaded reinforcing bar; and
a fitting mountable to an externally threaded reinforcing bar, the fitting including a body having a portion having a first free end that defines an opening configured to receive the reinforcing bar and the portion having a second end spaced from the first free end, the body having an internal thread for engagement with the thread of the reinforcing bar, the internal thread extending from the first free end of the portion to the second end of the portion, wherein the internal thread has an asymmetric thread form having an outer ramped portion and an inner portion, the outer ramped portion being inclined to a central axis of the coupler at a first angle, wherein the first angle remains constant throughout the internal thread from the first free end of the portion to the second end of the portion, wherein the externally threaded reinforcing bar is threaded into the internal thread of the coupler and tightened such that the external thread of the reinforcing bar is securely engaged in contact with the outer ramped portion of the internal thread.

11. The assembly of claim 10, wherein the external thread of the reinforcing bar is engaged in continuous line contact with the outer ramped portion of the internal thread.

12. The assembly of claim 11, wherein an outer rib of the external thread of the reinforcing bar is engaged in continuous line contact with the outer ramped portion of the internal thread.

13. The assembly of claim 12, wherein the coupler has an internal stop against which an end of the reinforcing bar abuts to facilitate engagement of the external thread of the reinforcing bar with the outer ramped portion of the internal thread.

* * * * *